United States Patent
Suzuki et al.

(10) Patent No.: US 8,817,807 B2
(45) Date of Patent: Aug. 26, 2014

(54) SYSTEM AND METHOD FOR DISTRIBUTED RESOURCE CONTROL OF SWITCHES IN A NETWORK ENVIRONMENT

(75) Inventors: Hiroshi Suzuki, Palo Alto, CA (US); Rong Pan, Saratoga, CA (US); Flavio Bonomi, Palo Alto, CA (US); Chien Fang, Danville, CA (US); Chiara Piglione, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 48 days.

(21) Appl. No.: 13/493,884

(22) Filed: Jun. 11, 2012

(65) Prior Publication Data
US 2013/0329577 A1 Dec. 12, 2013

(51) Int. Cl.
*H04L 12/54* (2013.01)
*H04L 12/56* (2006.01)

(52) U.S. Cl.
CPC ............... *H04L 12/54* (2013.01); *H04L 49/252* (2013.01)
USPC .......................................................... 370/428

(58) Field of Classification Search
CPC .............................. H04L 12/54; H04L 49/252
USPC .................................. 370/428–429
See application file for complete search history.

(56) References Cited

U.S. PATENT DOCUMENTS

| | | | |
|---|---|---|---|
| 6,405,258 B1 | 6/2002 | Erimli et al. | |
| 7,023,840 B2 * | 4/2006 | Golla et al. | 370/360 |
| 7,327,678 B2 | 2/2008 | Hamzah et al. | |
| 7,602,720 B2 * | 10/2009 | Bergamasco et al. | 370/235 |
| 7,830,793 B2 | 11/2010 | Gai et al. | |
| 2002/0176431 A1 * | 11/2002 | Golla et al. | 370/412 |
| 2003/0058802 A1 * | 3/2003 | Jones et al. | 370/252 |
| 2004/0095882 A1 | 5/2004 | Hamzah et al. | |
| 2004/0136359 A1 | 7/2004 | Ivancovsky et al. | |
| 2005/0111361 A1 | 5/2005 | Hosein | |
| 2006/0146875 A1 | 7/2006 | Yang | |
| 2006/0171313 A1 | 8/2006 | Shimonishi | |
| 2006/0285548 A1 * | 12/2006 | Hill et al. | 370/416 |
| 2007/0091802 A1 | 4/2007 | Pan et al. | |

(Continued)

OTHER PUBLICATIONS

Cao, et al., *Rainbow Fair Queueing: Fair Bandwidth Sharing Without Per-Flow State*, Proceedings, Nineteenth Annual Joint Conference of the IEEE Computer and Communications Societies, vol. 2, Mar. 26-30, 2000, Tel Aviv, Israel.

(Continued)

Primary Examiner — Phuc Tran
(74) Attorney, Agent, or Firm — Patent Capital Group

(57) ABSTRACT

An example method includes sending a virtual output queue (VOQ) length of a VOQ to an egress chip. The VOQ relates to a flow routed through an egress port associated with the egress chip. The method also includes receiving fair share information for the VOQ from the egress chip, and enforcing a control action on the incoming packets based on the fair share information. An ingress chip and the egress chip can be provided in a VOQ switch. The control action is a selected one of a group of actions, the group consisting of: (a) dropping packets, (b) pausing packets, and (c) marking packets. The method can further include receiving VOQ lengths of corresponding VOQs from respective ingress chips, where the VOQs relate to the flow. The method can also include calculating respective fair share information for each VOQ, and sending the fair share information to the respective ingress chips.

20 Claims, 14 Drawing Sheets

(56) References Cited

U.S. PATENT DOCUMENTS

| | | | |
|---|---|---|---|
| 2007/0223373 | A1 | 9/2007 | Sato et al. |
| 2009/0016222 | A1 | 1/2009 | Sebastian |
| 2009/0279560 | A1* | 11/2009 | Jones et al. .................. 370/413 |
| 2010/0149978 | A1 | 6/2010 | Johnson et al. |
| 2010/0149986 | A1 | 6/2010 | Johnson et al. |
| 2010/0220595 | A1 | 9/2010 | Petersen |
| 2013/0258847 | A1 | 10/2013 | Zhang et al. |
| 2014/0022901 | A1 | 1/2014 | Suzuki et al. |

OTHER PUBLICATIONS

Cisco Systems, Inc., White Paper, *Cisco MDS 9000 Family Quality of Service*, Feb. 2006, http://www.cisco.com/en/US/prod/collateral/modules/ps5991/prod_white_paper0900aecd8044c7f3.pdf.

Pan, et al., *Approximate Fairness through Differential Dropping*, ACM SIGCOMM Computer Communications Review, vol. 33, No. 2, Apr. 2003.

Pan, et al., *Max-Min Fair Bandwidth Allocation Algorithms for Packet Switches*, IEEE International Symposium on Parallel and Distributed Processing, Mar. 26-30, 2007, California.

Pappu, et al., *Distributed Queueing in Scalable High Performance Routers*, Proceedings of IEEE Infocom, Apr. 1-3, 2003, San Francisco, California.

Psounis, et al., *Approximate Fair Dropping for Variable-Length Packets*, IEEE Micro Magazine, Jan.-Feb. 2001.

USPTO Mar. 6, 2014 Non-Final Office Action from U.S. Appl. No. 13/554,697.

* cited by examiner

SYSTEM AND METHOD FOR DISTRIBUTED RESOURCE CONTROL OF SWITCHES IN A NETWORK ENVIRONMENT

TECHNICAL FIELD

This disclosure relates in general to the field of communications and, more particularly, to a system and a method for distributed resource control of switches in a network environment.

BACKGROUND

The field of communications has become increasingly important in today's society. One area of importance associated with network communications relates to network congestion. Network congestion can occur when a link or node is carrying so much data that its quality of service deteriorates, leading to packet loss and other undesirable network behavior. As traffic and the subscriber base of end users increases, so too does network congestion, as more and more users push higher amounts of traffic into existing network infrastructure. Recent studies have shown that overall data traffic is expected to double every year: leading to increasingly congested networks. Therefore, the efficient management of communication sessions and data flows becomes even more significant for optimizing performance in the network.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

DETAILED DESCRIPTION OF EXAMPLE EMBODIMENTS

Overview

An example method includes sending a virtual output queue (VOQ) length of a VOQ to an egress chip. The VOQ relates to a flow routed through an egress port associated with the egress chip. The method can also include receiving fair share information for the VOQ from the egress chip, and enforcing a control action on the incoming packets based on the fair share information. An ingress chip and the egress chip can be provided in a VOQ switch. The control action can be selected from a group consisting of: (a) dropping packets, (b) pausing packets, and (c) marking packets. In one embodiment, the fair share information includes a fair share of the egress port and/or class of service.

In more specific embodiments, the method includes calculating a probability of dropping packets at the ingress port based on a fair share portion (some, none, or all) and the arrival rate, with a high probability indicating that the incoming packets will be dropped at the ingress port. In yet other specific embodiments, the probability of dropping packets is further based on a weight assigned to the ingress port, with a higher weight indicating a lower probability. In various embodiments, the VOQ switch can support a large number of ingress ports and a large buffer size.

In other embodiments, the method can further include receiving (e.g., at the egress chip) VOQ lengths of corresponding VOQs from respective ingress chips, where the VOQs relate to the flow. The method can also include calculating respective fair share information for each VOQ, and sending the fair share information to the respective ingress chips. In one embodiment, the fair share information includes a global VOQ length determined as a sum of the VOQ lengths. In another embodiment, the fair share information comprises an instruction to drop packets if a sum of the VOQ lengths exceeds a predetermined threshold. In various embodiments, the calculating and the sending are repeated after a predetermined time. The VOQ lengths received during the predetermined time may be sampled to calculate the fair share information.

Example Embodiments

Figure 1:
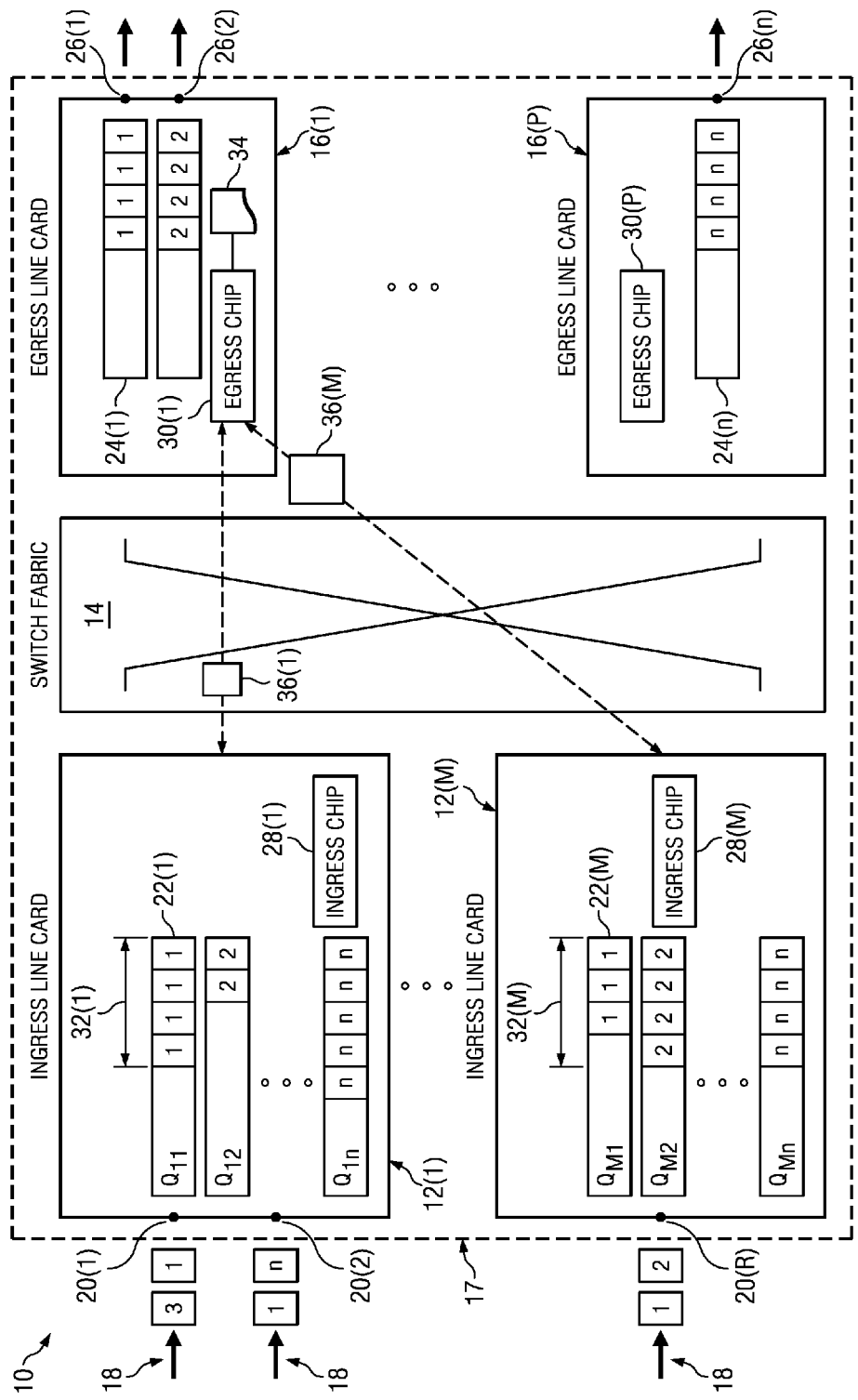
FIG. 1 is a simplified block diagram illustrating a communication system for distributed resource control of virtual output queue (VOQ) switches in a network environment.

Turning to FIG. 1, FIG. 1 is a simplified block diagram illustrating a communication system 10 for distributed resource control of virtual output queue (VOQ) switches in accordance with one example embodiment. Ingress line cards 12(1)-12(M) may be connected to a switch fabric 14. Switch fabric 14 may be connected to egress line cards 16(1)-16(P). In one embodiment, ingress line cards 12(1)-12(M), switch fabric 14, and egress line cards 16(1)-16(P) can comprise a portion of a VOQ switch 17.

Ingress line cards 12(1)-12(M) may receive incoming packets 18 arriving at ports 20(1)-20(R). In FIG. 1, ingress line card 12(1) is illustrated with two ports 20(1) and 20(2), and ingress line card 12(M) is illustrated with a single port 20(R). Nevertheless, any number of ports may be provisioned in ingress line cards 12(1)-12(M), and the number of ports shown herein is merely for ease of explanation, and is not a limitation. Ingress line cards 12(1)-12(M) may organize incoming packets 18 into ingress VOQs. For example, incoming packets 18 may be queued using an enqueue function that filters according to flows.

As used herein, the term "flow" can be inclusive of a stream of packets. Substantially all packets belonging to a specific flow may have a set of common properties. Each property can be a result of applying a function to one or more packet header fields (e.g., destination IP address), transport header fields (e.g., destination port number), application header fields (e.g., real-time protocol (RTP) header fields); one or more characteristics of the packet (e.g., number of multiprotocol label switching (MPLS) labels); or one or more fields derived from packet treatment (e.g., next hop IP address, output interface). A packet may be characterized as belonging to a particular flow if it satisfies substantially all properties of that flow. For example, packets with the same source-destination addresses may belong to a specific flow.

Ingress line card 12(1) may organize incoming packets 18 belonging to "Flow 1" into ingress VOQ $Q_{11}$, incoming packets 18 belonging to "Flow 2" into ingress VOQ $Q_{12}$, incoming packets 18 belonging to "Flow n" into ingress VOQ $Q_{1N}$, and so on. Likewise, ingress line card 12(M) may organize incoming packets 18 belonging to "Flow 1" into ingress VOQ $Q_{M1}$, incoming packets 18 belonging to "Flow 2" into ingress VOQ $Q_{M2}$, incoming packets 18 belonging to "Flow n" into ingress VOQ $Q_{MN}$, and so on. For ease of explanation, ingress VOQs in ingress line cards 12(1)-12(M) corresponding to an example flow (e.g., Flow 1) may be described herein as 22(1)-22(M), respectively. For ease of explanation, operations associated with only one flow is described herein. The operations may be extended to substantially all N flows in communication system 10 within the broad scope of the present disclosure.

Ingress line cards 12(1)-12(M) may forward the packets from their respective VOQs (e.g., $Q_{11}$ to $Q_{Mn}$) to egress line cards 16(1)-16(P). For example, ingress line cards 12(1)-12(M) may forward packets in Flow 1 to egress line card 16(1); ingress line cards 12(1)-12(M) may forward packets in Flow n to egress line card 16(P); and so on. Egress line cards 16(1)-16(P) may buffer the packets in egress queues 24(1)-24(n) and send the packets out through ports 26(1)-26(n), respectively. For example, packets belonging to Flow 1 may be buffered into egress queue 24(1) and sent out through port 26(1); packets belonging to Flow n may be buffered into egress queue 24(n) and sent out through port 26(n); and so on. Any number of ports 26(1)-26(n) may be provided in each of egress line cards 16(1)-16(P). In FIG. 1, an example configuration is illustrated by two ports 26(1) and 26(2) on egress line card 16(1) and one port 26(n) on egress line card 16(P). For ease of explanation, any one specific ingress line card "i" may be referenced as ingress line card 12(i); specific egress line card "j" may be referenced as egress line card 16(j); and so on.

In various embodiments, egress queues 24(1)-24(n) may be further organized according to a class of service (CoS). As used herein, the term "class of service" may include a classification of a packet based on any suitable classification mechanism. For example, the CoS may include eight (or more) different classes of services as provided in IEEE 802.1p specifications and can be expressed through a 3-bit prioritization field in a packet header. In another example, incoming packets 18 may be classified based on one or more values (e.g., quality control parameters, source address, destination address, etc.) extracted from the packets to identify a corresponding CoS associated with the packets. Each CoS may have an identifier associated therewith.

In various embodiments, each port 26(1)-26(n) may be associated with multiple CoS, and may buffer packets belonging to each CoS in separate egress queues. According to embodiments of communication system 10, subclasses of service may also be provided for each CoS. Packets from various ingress VOQs $Q_{11}$-$Q_{Mn}$ may also be separated into various CoS and organized into separate ingress VOQs in some embodiments. According to embodiments of communication system 10, the egress queue may be identified by its destination port and CoS. The ingress VOQ may be identified by its corresponding ingress line card, destination port, and CoS. The ingress line card may include mechanisms to distinguish packets arriving at two different ports (or having two subclasses) on the same ingress line card and buffered in the same ingress VOQ.

According to embodiments of communication system 10, line cards 12(1)-12(M) may include respective ingress chips 28(1)-28(M). Egress line cards 16(1)-16(P) may include respective egress chips 30(1)-30(P). In various embodiments, ingress chips 28(1)-28(M) and egress chips 30(1)-30(P) may co-operate to calculate a fair bandwidth sharing among ingress ports 20(1)-20(R). Embodiments of communication system 10 can add a powerful virtual queue length control capability to combats effects of bufferbloat (e.g., excessive buffering of packets inside a network causing high latency and jitter, and reducing network throughput) in systems that involve distributed queuing, such as VOQ switch 17.

For purposes of illustrating the techniques of communication system 10, it is important to understand the communications that may be traversing the communication system shown in FIG. 1. The following foundational information may be viewed as a basis from which the present disclosure may be properly explained. Such information is offered earnestly for purposes of explanation only and, accordingly, should not be construed in any way to limit the broad scope of the present disclosure and its potential applications.

A switch typically includes ingress ports (e.g., ports on ingress line cards) on buffered ingress line cards, a switch fabric, and egress ports (e.g., ports on egress line cards) on buffered egress line cards. Packets arrive at the ingress ports, and the switch fabric routes the packets to an egress port, from where it is forwarded on to its destination. In first-in-first-out (FIFO) switches, the oldest packet (e.g., packets at the head of the queue) is the only one available for forwarding to the egress port. If the egress port of the oldest packet is busy, the oldest packet blocks other, more recent packets, from being forwarded. Typically, the egress port would be busy due to a full egress buffer (e.g., congestion). Moreover, limited bandwidth of the channel also causes congestion. In one example, if the combined arrival rate of multiple incoming flows exceeds the output rate of outgoing flows, the egress buffer would be busy. The performance limiting phenomenon that occurs when recent packets are held up by the oldest packet is referred to as "head-of-line blocking." VOQs are generally an input queuing strategy used to address head-of-line blocking.

In VOQ switches, each ingress line card maintains a VOQ for each egress. For an N×N switch, each ingress line card i ($1 \le i \le N$) maintains a separate set of FIFO queues $VOQ_{i,j}$ for each egress port j ($1 \le j \le N$). Thus, there are N sets of $VOQ_{i,j}$ queues at each ingress line card. In some switches, each CoS k ($1 \le k \le 8$) may also have its own VOQ; thus, there may be up to 8×N sets of $VOQ_{i,j,k}$ at the ingress line card. Incoming packets are stored in appropriate VOQs according to their flow identification. Individual VOQs might be blocked at ingress line cards based on congestion at the corresponding egress ports, but traffic queued for different (non-blocked) destinations can continue to flow without getting delayed behind packets waiting for the blocking to clear on a congested egress port. Switches implementing VOQs send packets to egress ports following a router algorithm that may be targeted to achieve fairness.

Fair bandwidth sharing may enhance (or simplify) end-to-end congestion control mechanisms. In general, in a bandwidth sharing scheme, before packet transmission, an ingress line card claims a portion of the bandwidth at each egress port for its traffic. Alternatively, an egress port can allocate its available bandwidth to different ingress line cards. Typically, each ingress line card (or egress port) has only local bandwidth information; therefore, it does not know how much bandwidth other ingress line cards have claimed at a specific egress port.

Fair share of bandwidth at the egress port among various ingress line cards can be calculated using a variety of methods. For example, fair share can be calculated using max-min fair bandwidth allocation algorithms. In general, a share of bandwidth is fair ("fair share") among ingress ports when it is impossible to increase the share for any ingress port without simultaneously reducing the share for another ingress port.

Various mechanisms are have been implemented to achieve fair bandwidth sharing. For example, per-flow queuing mechanisms operate by maintaining a separate queue for each flow and performing FIFO ordering with tail-drop on each queue. Because of per-flow queuing, packets belonging to different flows may be isolated from each other, and one flow may not be capable of degrading the quality of another flow.

Per-flow dropping mechanisms employ a single FIFO queue, but maintain per-flow state to determine which packets to drop under congestion. For example, a router implementing weighted random early detection (WRED) may maintain a single FIFO shared by all flows and drop an arriving packet at random during periods of congestion. The probability of dropping the packet may increase with increasing congestion level. However, both per-flow queuing and per-flow dropping mechanisms require per-flow state information, thus potentially reducing their suitability for high speed backbone trunks handling large number of flows.

In another fair share algorithm implementation, packets are labeled with a flow arrival rate at an edge router. The labeled packets are forwarded to core routers in the network. Core routers estimate a fair share and probabilistically drop packets whose arrival rate (as marked) exceeds the fair share. Another mechanism uses approximate fair dropping (AFD), which bases dropping decisions at the ingress line cards on recent history of incoming packets. AFD uses the history to estimate the flow's current sending rate and then drops packets with a probability designed to limit that flow's throughput to a fair share. The fair share is estimated at the ingress line card based on comparing the length of the VOQ at the ingress line card to a reference length provided by an operator and to previously measured VOQ lengths. Dropping is not applied uniformly across flows, but is applied differentially based on an estimate of the flow's current sending rate. The exact form of differential dropping is chosen to approximate fair bandwidth allocations. The AFD algorithm is typically implemented at ports on individual ingress line cards and does not include any information from ports on other ingress line cards, or egress ports in the VOQ switch.

In other input buffering switching systems with VOQs, packet drops occur at the ingress VOQs, and packet drops at the egress queues are controlled (or eliminated) by flow control and shallow egress buffers. The packet drop decision is typically performed based on the local ingress VOQ length. For example, when $Q_{ijk}$=VOQ length for input port i, output port j, class k, a decision to drop an incoming packet may be made if $Q_{ijk}$>drop_threshold of ijk or if sum of Qijk at the ingress chip>drop_threshold for the ingress line card. Similar schemes are generally used for pausing packets (rather than dropping them).

However, such packet drop/pause flow control mechanisms can have at least two problems associated with system performance. First, a maximum allowed packet latency from the ingress ports to the egress ports is not limited to a deterministic value when the ratio of ingress ports to egress ports varies or increases. As the number of ingress ports, say N, is increased, the maximum latency is usually multiplied by N, mainly because the queue limit or packet drop decision at a specific ingress line card is purely based on local VOQ length at the specific ingress line card, independent of how many ingress VOQs are accessing the same destination egress port.

Second, fair bandwidth allocation among multiple ingress ports going to the same egress port is not achieved. Consider an example VOQ switch with 8 ports in an ingress line card A, and 2 ports in another ingress line card B, with all ten ingress ports going to the same egress port in an egress line card C. Ideally, all 10 ingress ports should get 10% of the egress port bandwidth. However, 8 ports of chip A may get 50% and 2 ports of chip B may get 50% under some fair share bandwidth allocation mechanisms described above. Thus, each of the 2 ports of chip B get more bandwidth (25% each) than each of the 8 ports of chip A (6.25%).

In typical VOQ switches, each ingress line card's VOQ buffer is disjoint and limited. For example, 20 MB buffer space is shared by 24K VOQs from 20 ingress ports. Each VOQ is allowed to oversubscribe the buffer (e.g., 5 MB or 4 ms equivalent). When oversubscription is high, delay is long. With Transmission Control Protocol (TCP) communications, long delay can translate to timeouts, thereby wasting resources. Moreover, the maximum number of VOQs that can be congested without degrading performance is limited (e.g., 4). Each ingress line card makes its own choice for buffering, which collectively may result in storing many data for one egress port and seriously affecting other egress ports. Additionally, in some mechanisms (e.g., tail drop, WRED), ingress line cards can allocate bandwidth unpredictably, leading to unfair bandwidth allocation among the ingress ports. None of the fair bandwidth sharing mechanisms currently implemented in VOQ switches considers bandwidth sharing based on the egress queue, or based on the ingress ports (rather than ingress line cards), thus leading to unpredictable bandwidth allocation among the various ingress line cards.

Communication system 10 is configured to address these issues (and others) in offering a system and a method for distributed resource control of VOQ switches in a network environment. Consider an example embodiment where ingress chips 28(1)-28(M) receive packets corresponding to Flow 1, and aggregate the packets into respective VOQs 22(1)-22(M). Assume, for the sake of explanation, and not as a limitation, that packets of Flow 1 are to be routed through egress line card 16(1). According to an embodiment of communication system 10, VOQs 22(1)-22(M) may have respective VOQ lengths 32(1)-32(M). As used herein, the term "VOQ length" refers to the amount of memory (in terms of storage space, or corresponding buffering time) used by the corresponding VOQ.

According to embodiments of communication system 10, ingress chips 28(1)-28(M) may update egress chip 30(1) with respective VOQ lengths 32(1)-32(M). In one embodiment, ingress chips 28(1)-28(M) may send VOQ lengths 32(1)-32(M) after a predetermined duration (e.g., 200 μs-2 ms). In another embodiment, any one of ingress chips 28(1)-28(M) may send a corresponding one of VOQ lengths 32(1)-32(M) that exceeds a predetermined threshold (e.g., 20 KB). In yet another embodiment, ingress chips 28(1)-28(M) may piggyback information about VOQ lengths 32(1)-32(M) on other packets destined to egress chip 30(1) as and when the packets are sent out.

Egress chip 30(1) may aggregate VOQ lengths 32(1)-32(M) into a global VOQ length 34 corresponding to egress port 26(1). Each egress port 26(1)-26(N) may be associated with a corresponding global VOQ length applicable to the respective flow. Egress chip 30(1) may subsequently periodically feedback fair share information 36(1)-36(M) to ingress chips 28(1)-28(M). In some embodiments, egress chips 30(1)-30(P) may signal a tail drop if global VOQ length 34 exceeds a threshold (e.g., 20 ms buffering). In one embodiment, egress chip 30(1) may calculate, for each of VOQs 22(1)-22(M), a respective fair share, and include the fair shares in fair share information 36(1)-36(M). In another embodiment, egress chip 30(1) may send global VOQ length 34, rather than the fair shares, in fair share information 36(1)-36(M).

As used herein, a VOQ's fair share of an egress port indicates a transmission rate allocated to the VOQ according to any generally known fair share allocation algorithms. "Fair share information" can include data relevant to fair shares, including fair shares themselves, global VOQ length 34, tail drop instructions, and any other data. In embodiments, where fair share information 36(1)-36(M) includes global VOQ length 34, fair share information 36(1)-36(M) may be identical to each other. On the other hand, in embodiments, where fair share information 36(1)-36(M) includes fair shares (calculated by egress chip 30(1)) corresponding to VOQs 22(1)-22(M), fair share information 36(1)-36(M) may be different from each other. In some embodiments, fair share information may include a combination of global VOQ length 34 and calculated fair shares, as appropriate. Any such suitable combination may be used without departing from the scope of the embodiments.

Ingress chips 28(1)-28(M) may react to fair share information 36(1)-36(M) from egress chip 30(1). In one embodiment, ingress chips 28(1)-28(M) may calculate respective fair shares of corresponding VOQs 22(1)-22(M), and adjust the fair shares for each of ingress ports 28(1)-28(R), or subclass, as appropriate. In another embodiment, ingress chips 28(1)-28(M) may receive calculated fair shares in respective fair share information 36(1)-36(M) and adjust the fair shares for each of ingress ports 28(1)-28(R), or subclass as appropriate.

Subsequently, ingress chips 28(1)-28(M) may implement flow accounting (e.g., classify packets according to flows, update per-flow account for each packet, etc.), monitor incoming packets 18 and take a suitable control action based on fair share information 36(1)-36(M). For example, ingress chips 28(1)-28(M) may follow tail drop instructions and stop storing useless data. In another example, ingress chips 28(1)-28(M) may randomly drop packets (e.g., based on fair share information 36(1)-36(M)) to enforce fairness. In one embodiment, ingress chips 28(1)-28(M) may monitor an arrival rate of incoming packets 18 of the flow, and determine if the arrival rate is greater than the fair share. If the arrival rate is greater than the fair share, the appropriate ingress chip (e.g., 28(1), 28(M), etc.) may enforce a suitable control action on incoming packets 18, such as dropping packets, pausing packets, or marking packets.

In various embodiments, the operations described herein may be repeated after a predetermined duration (e.g., 200 μs-2 ms). For example, ingress chips 28(1)-28(M) may send VOQ lengths 32(1)-32(M) randomly in time, or at specific intervals, as appropriate, based on particular configurations. Egress chip 30(1) may sample VOQ lengths 32(1)-32(M) during the predetermined duration, and calculate global VOQ length 34 for the predetermined duration. Egress chip 30(1) may also calculate fair shares of VOQs 22(1)-22(M) for the predetermined duration in some embodiments. Ingress chips 28(1)-28(M) may take control actions for the predetermined duration. In embodiments where VOQ switch 17 implement separate VOQs for each CoS, egress chip 30(1) (and/or ingress chips 28(1)-28(M)) may calculate the fair shares for the relevant CoS (and egress port). The fair share may vary with the CoS, for example, with a higher CoS getting a higher share of bandwidth compared to a lower CoS.

Although FIG. 1 herein has been described with respect to a particular flow (e.g., Flow 1) routed through a specific egress line card (e.g., 16(1)), the system and methods described herein are applicable to any flow, and corresponding ingress line cards and egress line cards. Substantially all egress chips 30(1)-30(P) in communication system 10 may implement the activities described herein simultaneously or otherwise, as appropriate. For example, each of egress chips 30(1)-30(P) may implement the process described herein for their respective flows, and applicable egress ports. Thus, egress chip 30(1) may calculate another fair share information for egress port 26(2) and another set of VOQs; likewise, egress chip 30(P) may calculate yet another fair share information for egress port 26(n) and yet another set of VOQs; and so on.

Consider an example embodiment, where only ingress line cards 12(1) and 12(M) receive packets in Flow 1. Egress chip 30(1) may be configured to send out packets belonging to Flow 1 over egress port 26(1). Ingress line card 12(1) may include two ingress ports 20(1) and 20(2), receiving packets in Flow 1. The packets in Flow 1 may be buffered into VOQ 22(1) in ingress line card 12(1). Ingress line card 12(M) may include a single ingress port 20(R), also receiving packets in Flow 1. The packets in Flow 1 may be buffered into VOQ 22(M) in ingress line card 12(M). Assuming arrival rate of incoming packets 18 at each port is the same, because ingress line card 12(M) has only half the number of ports receiving packets in Flow 1, VOQ 22(M) may be smaller than VOQ 22(1). Ingress chip may send VOQ length 32(1) to egress chip 30(1). Likewise, ingress chip 28(M) may send VOQ length 32(M) to egress chip 30(1).

Egress chip 30(1) may sum up VOQ lengths 32(1) and 32(M), determine global VOQ length 34, and compute a fair share for each of VOQ 22(1) and 22(M). The fair share for VOQ 22(1) may be determined to be 66% and for VOQ 22(M) may be 33%, based on the relative VOQ lengths 32(1) and 32(M). Egress chip 30(1) may send the fair shares in fair share information 36(1) and 36(M) to ingress chips 28(1) and 28(M), respectively. Ingress chip 28(1) may calculate the fair shares for each ingress port 20(1) and 20(2). For example, ingress chip 28(1) may determine that ingress port 20(1) and 20(2) may each receive 33% fair share of the total bandwidth at egress port 26(1). Ingress chips 28(1) and 28(M) may monitor arrival rate of incoming packets 18 and drop (or pause or mark) packets when the arrival rate exceeds the allocated fair share. For example, if the arrival rate is 4 Gbps, and the fair share is 3 Gbps, the drop probability would be ¼ (i.e., 25% of incoming packets 18 would be dropped, or paused, or marked).

Turning to the infrastructure of communication system 10, ingress line cards 12(1)-12(M) and egress line cards 16(1)-16(P) may include electronic circuits that interface with switch fabric 14 to perform the operations described herein. In addition to respective ingress chips 28(1)-28(M), ingress line cards 12(1)-12(M) may include processors, network interfaces, memory elements, cables, and other components. Likewise, egress chips 30(1)-30(P) may include processors, network interfaces, memory elements, cables, and other components in addition to respective egress chips 30(1)-30(P).

As used herein, the term "VOQ switch" refers to a network element that implements one or more VOQs at its ingress line cards and is suitably configured to route packets from one node to another.

The term "network element" may include computers, network appliances, servers, routers, switches, gateways, bridges, load balancers, firewalls, processors, modules, or any other suitable device, component, element, or object operable to exchange information in a network environment. Moreover, the network elements may include any suitable hardware, software, components, modules, interfaces, or objects that facilitate the operations thereof. This may be inclusive of appropriate algorithms and communication protocols that allow for the effective exchange of data or information. A node is any electronic device (e.g., machine device or a mobile device), client, server, peer, service, application, or other object capable of sending, receiving, or forwarding information over communications channels in a network. Examples of VOQ switches include Cisco® 12000 Internet Router, Cisco Nexus® 7000 Switch, etc.

It may be noted that the label "ingress" and "egress" are provided merely for ease of explanation and are not limitations. Any line card (e.g., 12(1) or 16(1)) in communication system 10 may include both ingress and egress functionalities, performing ingress functions for certain flows, and egress functions for other flows. In some embodiments, line cards (e.g., 12(1)) may include both an ingress chip (e.g., 28(1)) and an egress chip (e.g., 32(1)). In various embodiments, ingress chip and egress chip functionalities may be provisioned on a single component. In other embodiments, ingress chip and egress chip functionalities may be provided in separate components. In yet other embodiments, ingress chip and/or egress chip functionalities may be integrated with other functionalities of the respective line cards, such as packet processing, queuing, buffering, and quality of service (QoS).

Switch fabric 14 is a combination of hardware and software that routes packets from ingress line cards 12(1)-12(M) to appropriate egress line cards 16(1)-16(M). Switch fabric 14 includes switching units, integrated circuits, and programming that allows switching paths to be controlled. In some embodiments, switch fabric 14 may include multiple cards (e.g., switch fabric cards) installed in a chassis. In various embodiments, switch fabric 14 may provide interconnectivity between input ports 20(1)-20(R) and output ports 26(1)-26(n). An integrated scheduler in switch fabric 14 may allow a contention-free match between input-output pairs. The scheduler may also ensure that space is available in the egress buffers before a VOQ is serviced. Switch fabric 14 may comprise switch elements that receives packets and switch them to appropriate egress ports, processors that control the operation of the switch cards, and power modules, that provide power to the components of switch fabric 14. In addition, switch fabric 14 may include many logical components such as schedulers and multicast support modules.

Communication system 10 may include one or more distinct interfaces, represented by ingress ports 20(1)-20(R) and egress ports 26(1)-26(n), to facilitate communication via various networks (including both internal and external networks) to which VOQ switch 17 may be connected. Such network interfaces (e.g., ports 20(1)-20(R); 26(1)-26(n)) may be inclusive of multiple wireless interfaces (e.g., WiFi, WiMax, 3G, 4G, white space, 802.11x, satellite, Bluetooth, near field communication (NFC), LTE, GSM/WCDMA/HSPA, CDMA1x/EVDO, DSRC, CAN, GPS, etc.). Other interfaces represented by ingress ports 20(1)-20(R) and egress ports 26(1)-26(n) may include physical ports (e.g., Ethernet, USB, HDMI, etc.), interfaces for wired and wireless internal subsystems, and the like.

Elements of FIG. 1 may be coupled to one another through one or more interfaces employing any suitable connection (wired or wireless), which provides a viable pathway for electronic communications. Additionally, any one or more of these elements may be combined or removed from the architecture based on particular configuration needs. Note that the numerical and letter designations assigned to the elements of FIG. 1 do not connote any type of hierarchy; the designations are arbitrary and have been used for purposes of teaching only. Such designations should not be construed in any way to limit their capabilities, functionalities, or applications in the potential environments that may benefit from the features of communication system 10.

Embodiments of communication system 10 may be used in any network environment configured over a physical infrastructure that may include one or more networks and, further, may be configured in any form including, but not limited to, local area networks (LANs), wireless local area networks (WLANs), VLANs, metropolitan area networks (MANs), wide area networks (WANs), VPNs, Intranet, Extranet, any other appropriate architecture or system, or any combination thereof that facilitates communications in a network. In some embodiments, communication links between various components of communication system 10 may represent any electronic link supporting a LAN environment such as, for example, cable, Ethernet, wireless technologies (e.g., IEEE 802.11x), ATM, fiber optics, etc. or any suitable combination thereof.

Embodiments of communication system 10 may provide for buffer limit and latency control and achieve switch latency as if VOQ switch 17 were a single stage shared buffer fabric. Fairness among the multiple flows accessing a same congested port (e.g., egress port 26(1)) may be achieved with communication system 10. Embodiments may further distribute resource control in VOQ switch 17 by using small table sizes, capturing top heavy hitter VOQs, rather than all VOQs in VOQ switch 17. Embodiments of communication system 10 can achieve efficient sharing of buffering, tight control of latency regardless of ingress oversubscription ratio, weighted fair rate allocation per ingress port, and may provide for simple implementation with low overhead. Additionally, with integrated buffer (e.g., much larger than shallow VOQs), communication system 10 can provide desired QoS functions (e.g., 64 CoS) easily.

Figure 2:
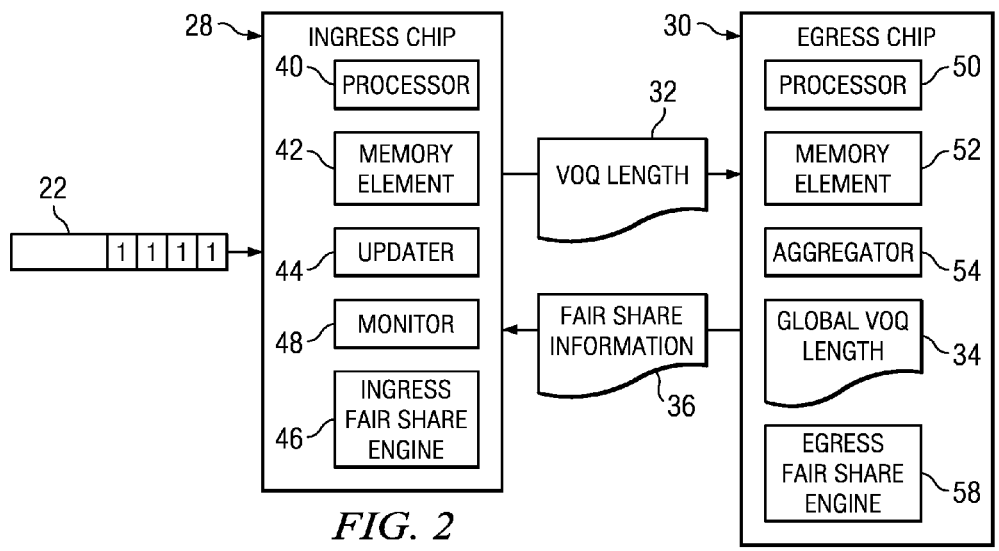
FIG. 2 is a simplified block diagram illustrating example details of the communication system in accordance with one embodiment.

Turning to FIG. 2, FIG. 2 is a simplified block diagram illustrating example details of communication system 10. A representative ingress chip 28 includes a processor 40, a memory element 42, an updater 44, an ingress fair share engine 46, and a monitor 48. A representative egress chip 30 includes a processor 50, a memory element 52, an aggregator 54, and an egress fair share engine 58. Updater 44 may measure VOQ length 32 of VOQ 22 and send VOQ length 32 to egress chip 30 after a predetermined duration (e.g., 200 μs-2 ms). VOQ 22 may be identifiable with a VOQ ID. Information sent by updater 44 to egress chip 30 may include, in addition to VOQ length 32, the corresponding VOQ ID as well.

In one embodiment, updater 44 may send VOQ length 32 to egress chip 30. In some embodiments, updater 22 may send VOQ length 32 every 200 μs or 2 ms. In other embodiments, updater 44 may send VOQ length 32 to egress chip 30 when a VOQ length threshold (e.g., 20 KB) is exceeded. In yet other embodiments, updater 44 may piggy back VOQ length 32 on other packets as and when the packets are sent out. Aggregator 54 may sample VOQ length 32 during a predetermined duration and aggregate VOQ length 32 from a plurality of ingress chips (e.g., 28(1)-28(M)) to determine a global VOQ length 34. In some embodiments, if global VOQ length 34 exceeds a predetermined threshold, egress chip may send tail drop instructions (e.g., "do not buffer any more packets") to ingress chip 28 in fair share information 36.

In some embodiments, egress fair share engine 58 may calculate a fair share for VOQ 22 based on global VOQ length 34. In another embodiment, the fair share $M_{fair}$ for VOQ 22 is calculated according to the following equation:

$$M_{fair} = M_{fair} - \frac{(Q_{len} - Q_{ref})}{2^{b_1}} - \frac{(Q_{len} - Q_{len\_old})}{2^{b_2}}$$

where $Q_{len}$ is the currently measured global VOQ length 34; $Q_{len\_old}$ the previously measured global VOQ length 34; $Q_{ref}$ is the reference queue length (set by an operator); and $b_1$ and $b_2$ are averaging parameters (e.g., design parameters). Egress chip 30 may unicast fair share information 36 back to ingress chip 28 that sent VOQ length 32. In another embodiment, fair share information 36 may include only global VOQ length 34, rather than the fair share. Fair share information 36 may be unicast separately to all ingress chips 28(1)-28(M) that sent the VOQ length information.

Ingress fair share engine 46 may receive fair share information 36 and calculate fair shares for each ingress port or subclass. In some embodiments, for example where VOQ switch 17 implements AFD/WRED algorithms, ingress fair share engine 46 may re-use the AFD/WRED data structures to calculate fair shares for each ingress port or subclass. Ingress fair share engine 46 may also compute a drop probability value from the fair share of the ingress port or subclass and arrival rate of incoming packets 18, measured by monitor 48.

In one embodiment, the drop probability, DropProb, is computed from the following equation:

Ar(ingressPort or SubClass, destPort, CoS)×(1−Drop-Prob)=weight×FairShare(destPort, CoS)

where Ar is the arrival rate of incoming packets 18, and it is computed for each ingress port 20 (or subclass), destination port 26, and CoS; FairShare is the calculated fair share based on fair share information 36, determined for each destination port 26 and CoS; and weight is a parameter assigned by a network administrator to the specific ingress port or CoS. For example, some ingress ports may support high priority traffic, and dropping packets in such high priority traffic may not be desired. Therefore, the ingress port may be assigned a weight greater than other ingress ports to ensure that packets at the other ingress port are preferentially dropped over the high priority ingress port. Monitor 48 may make drop decisions based on the computed drop probability. In other embodiments, monitor 48 may pause incoming packets 18, rather than drop them; or mark them with the drop probability for dropping (or pausing) later. The packets may be paused for predetermined time duration. In various embodiments, VOQ switch 17 can support a large number of ingress ports 20 and a large buffer size.

Figure 3A:
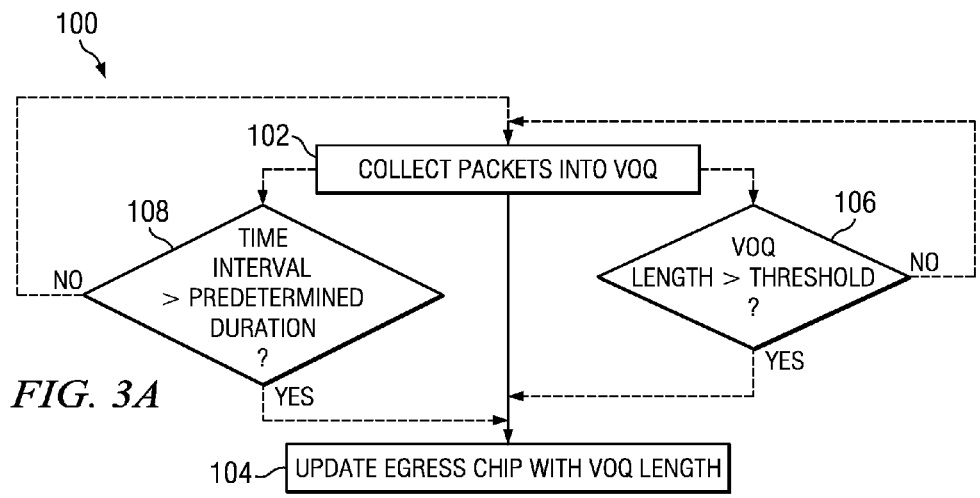
FIG. 3A is a simplified flow diagram illustrating example activities that may be associated with embodiments of the communication system.
Figure 3B:
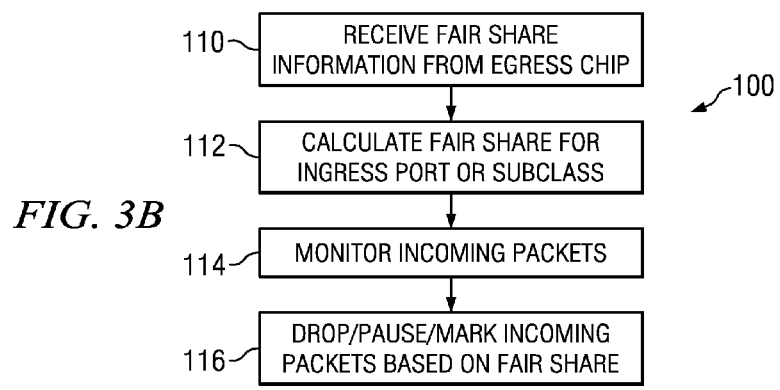
FIG. 3B is a simplified flow diagram illustrating other example activities that may be associated with embodiments of the communication system.

Turning to FIGS. 3A and 3B, FIGS. 3A and 3B are simplified flow diagrams illustrating example operational activities 100 at ingress chip 28 according to an embodiment of communication system 10. In FIG. 3A, operations 100 include 102, at which ingress chip 28 collects packets into VOQ 22. At 104, ingress chip 28 updates egress chip 30 with VOQ length 32. In some embodiments, at 106, ingress chip 28 determines if VOQ length 32 is greater than a predetermined threshold (e.g., 20 KB for a 24K maximum VOQ buffer size). If not, the operations may loop back to 102. If VOQ length 32 is greater than the predetermined threshold, then ingress chip 28 may update egress chip 30 with VOQ length 32 at 104.

In other embodiments, ingress chip 28 may determine if a time interval is greater than a predetermined duration (e.g., 200 μs-2 ms) at 108. In some embodiments, the predetermined duration may be determined from a buffer size of respective egress line cards 16(1)-16(P). For example, the predetermined duration may be set at less than 1/10 of buffering. If not, the operations may loop back to 102; otherwise, the operations step to 104.

Turning to FIG. 3B, operations 100 include 110, at which ingress chip 28 may receive fair share information 36 from egress chip 30. In some embodiments, ingress chip 28 may receive fair share information periodically, for example, as triggered by a timer. At 112, ingress chip 28 may calculate fair share for each ingress port or subclass. In some embodiments, ingress chip 28 may calculate the fair share based on global VOQ length 34 in fair share information 36. In other embodiments, ingress chip 28 may adjust fair shares in fair share information 36 for each ingress port. At 114, ingress chip 28 may monitor incoming packets 18. At 116, ingress chip 28 may drop or pause or mark incoming packets 18 based on the calculated fair share.

Figure 4:
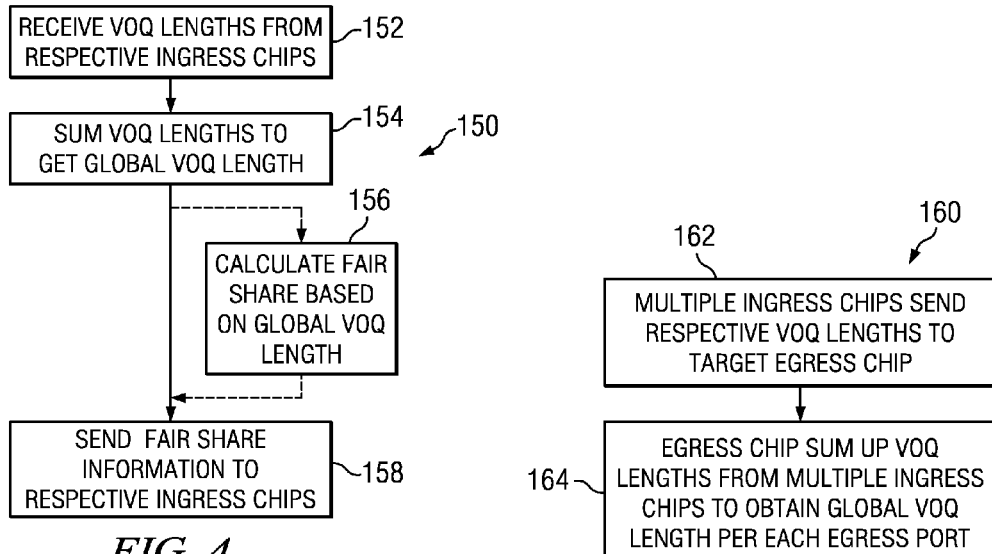
FIG. 4 is a simplified flow diagram illustrating yet other example activities that may be associated with embodiments of the communication system.

Turning to FIG. 4, FIG. 4 is a simplified flow diagram illustrating example operational activities at egress chip 30 according to an embodiment of communication system 10. Operations 150 include 152, at which egress chip 30 may receive VOQ lengths (e.g., 32(1)-32(M)) from corresponding ingress chips (e.g., 28(1)-28(M)). At 154, egress chip 30 may sum the VOQ lengths (e.g., 32(1)-32(M)) to get global VOQ length 34. At 156, in some embodiments, egress chip 30 may calculate fair share for each VOQ (e.g., 22(1)-22(M)) based on global VOQ length 34. At 158, egress chip 30 may send fair share information 36 to ingress chips 28(1)-28(M). In some embodiments, egress chip 30 may send fair share information 36 when triggered by a timer. Various other events may also trigger the sending process, based on particular configuration settings. In another embodiment, ingress chips 28(1)-28(M) can pull fair share information 36 from egress chip 30.

Figure 5:
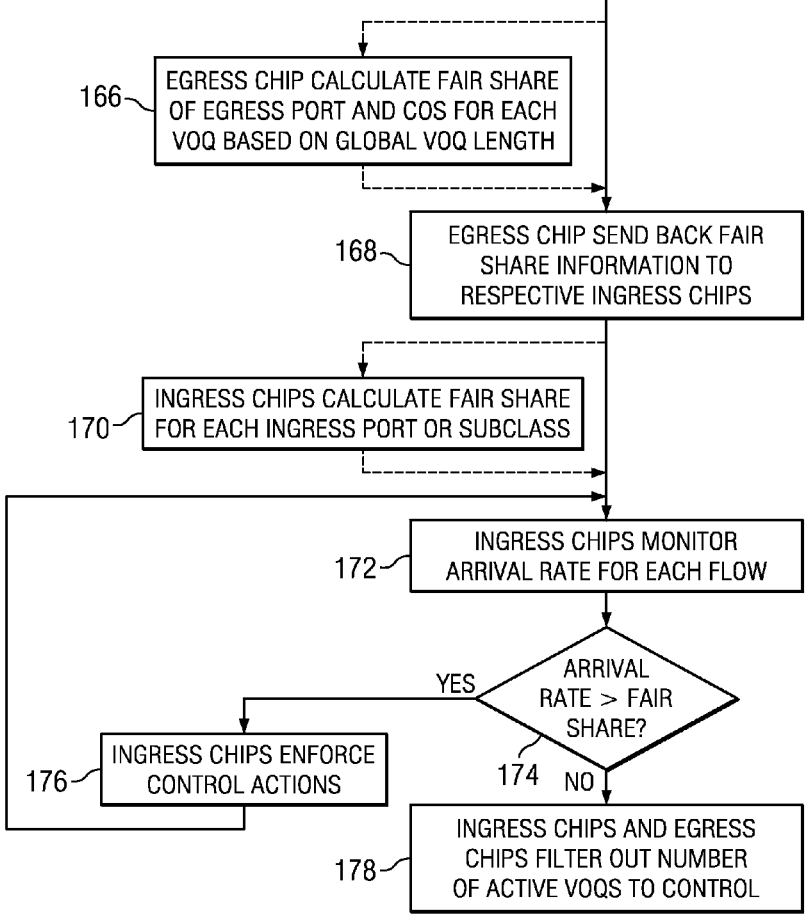
FIG. 5 is a simplified flow diagram illustrating yet other example activities that may be associated with embodiments of the communication system.

Turning to FIG. 5, FIG. 5 is a simplified flow diagram illustrating example operational activities associated with distributed resource control of VOQ switch 17. Operations 160 may include 162, at which ingress chips 28(1)-28(M) send respective VOQ lengths 32(1)-32(M) to egress chip 30(1). Egress chip 30(1) may be a target egress for the flow (e.g., Flow 1) associated with VOQs 22(1)-22(M) having VOQ lengths 32(1)-32(M). At 164, egress chip 30(1) may sum up VOQ lengths 32(1)-32(M) from multiple ingress chips 28(1)-28(M) to obtain global VOQ length 34 for egress port 26(1) and CoS. At 166, in some embodiments, egress chip 30(1) may calculate fair share of egress port 26(1) and CoS for each VOQ (e.g., 22(1)) based on global VOQ length 34. At 168, egress chip 30 may send fair share information 36(1)-36(M) to respective ingress chips 28(1)-28(M).

At 170, ingress chips 28(1)-28(M) may calculate respective fair shares for each ingress port (e.g., 18(1)-18(R)) or subclass. At 172, ingress chips 28(1)-28(M) may monitor arrival rate of incoming packets 18 for each flow (e.g., Flow 1). At 174, the arrival rate may be compared to the calculated fair share. If the arrival rate is greater than the fair share, ingress chips 28(1)-28(M) may enforce control actions. In some embodiments, the control action may be dropping packets. In other embodiments, the control action may be pausing packets for the predetermined duration. In yet other embodiments, the control action may be marking packets. For example, incoming packets 18 may be marked with a "mark-Factor" based on a mark probability computed in a manner similar to computing drop probability.

At 172, ingress chips 28(1)-28(M) and egress chips 30(1)-30(P) may filter out number of active VOQs to control, for example, using an elephant trap or similar filtering mechanisms. The elephant trap mechanism may use probabilistic sampling techniques to randomly select active VOQs. Active VOQs may be more frequently sampled than other less active VOQs. In some embodiments, "heavy hitter" VOQs may be targeted for operations 160, in preference to relatively less active VOQs.

Figure 6:
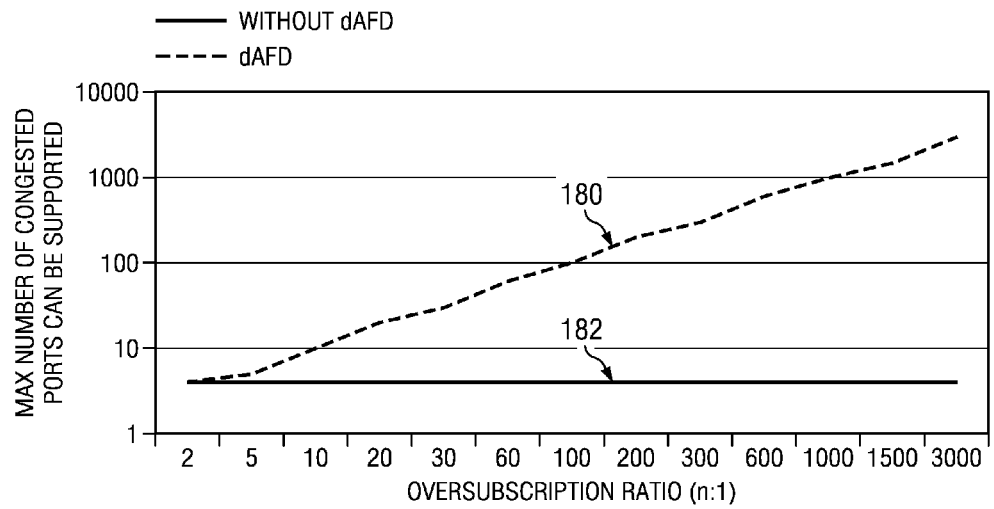
FIG. 6 is a graph illustrating comparisons between embodiments of the communication system.

Turning to FIG. 6, FIG. 6 is a graph illustrating a maximum number of congested ports supported for various oversubscription ratios in different embodiments of communication system 10. An embodiment implementing operations described herein may be denoted as "dAFD" and indicated by line 180; another embodiment that does not implement the operations described herein may be denoted as "without dAFD" and indicated by line 182. As oversubscription ratio increases, each chip's share of buffering becomes smaller with dAFD, and the maximum number of congested ports that can be supported increases, as indicated by line 180. On the other hand, without dAFD, the maximum number of ports that can be supported is independent of oversubscription, and based on the buffer limit, as indicated by line 182.

Figure 7:
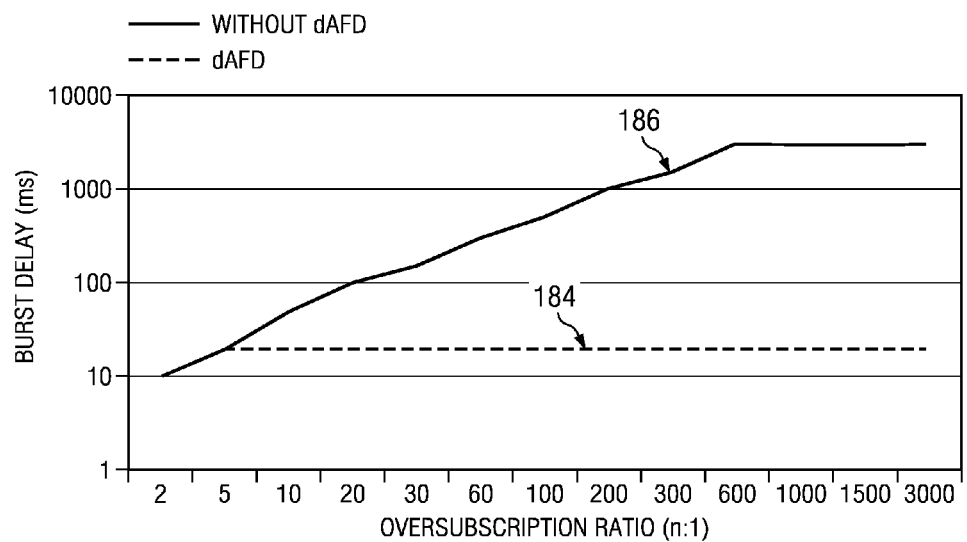
FIG. 7 is another graph illustrating other comparisons between embodiments of the communication system.

Turning to FIG. 7, FIG. 7 is a graph illustrating burst delay for various oversubscription ratios in different embodiments of communication system 10. An embodiment implementing operations described herein may be denoted as "dAFD" and indicated by line 184; another embodiment that does not implement the operations described herein may be denoted as "without dAFD" and indicated by line 186. With dAFD, each egress queue may be maximized up to its configured maximum latency (e.g., global VOQ length 34<20 ms or 25 MB of data) regardless of oversubscription ratio, as indicated by line 184. On the other hand, without dAFD, the burst delay may increase until a system limit is reached, as indicated by line 186.

Figure 8:
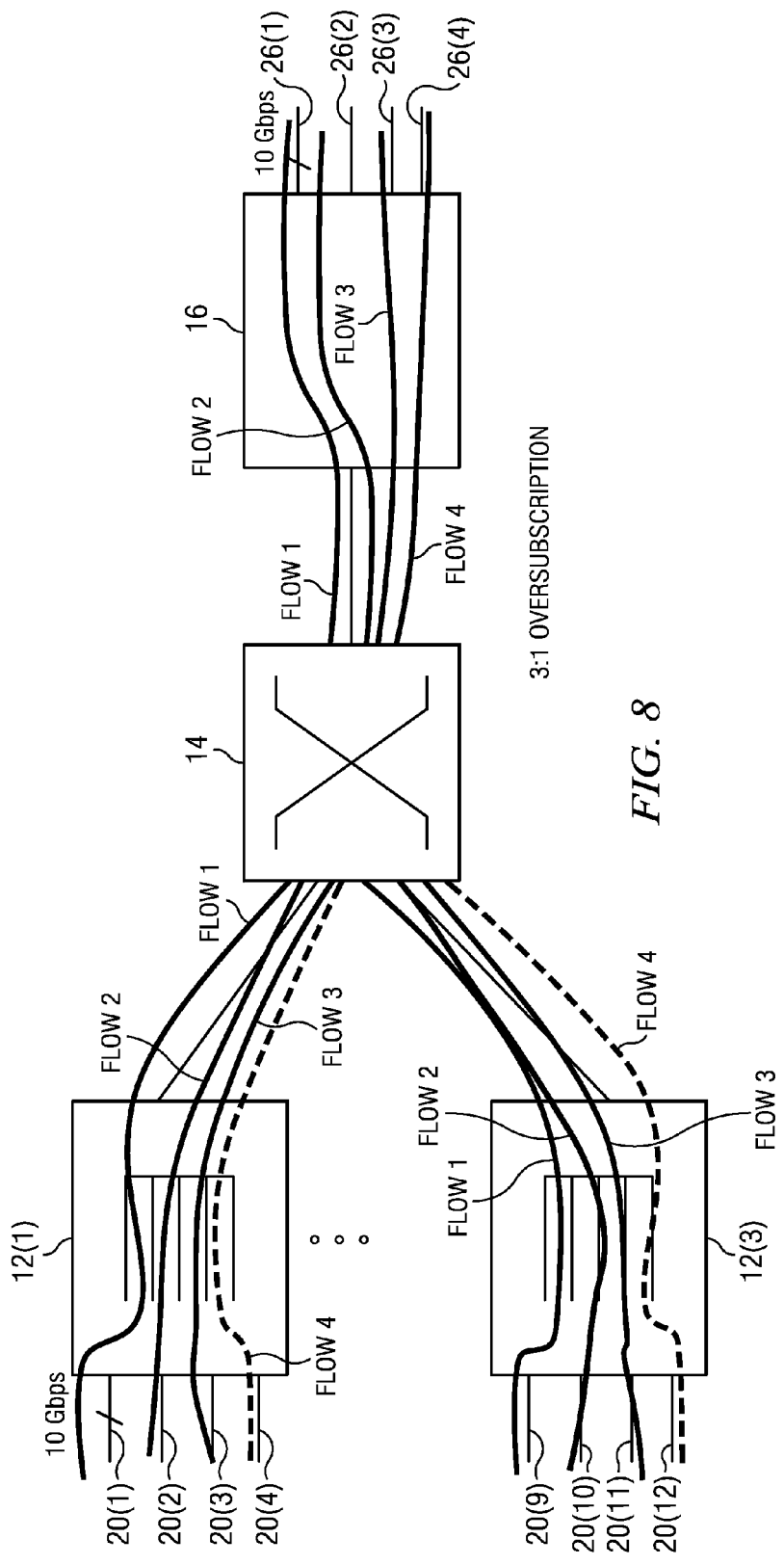
FIG. 8 is a simplified diagram illustrating an example simulation set-up of an embodiment of the communication system.

Turning to FIG. 8, FIG. 8 is a simplified block diagram illustrating a simulation set up of an embodiment of communication system 10. Ingress line cards 12(1)-12(3) routed three traffic flows (Flow 1, Flow 2, and Flow 3) to one egress line card 16, providing an oversubscription of 3:1. Ingress line cards 12(1)-12(3) included ingress ports 20(1)-20(12), with egress line card 16 having four ports 26(1)-26(4). Switch fabric 14 routed flows from ingress line cards 12(1)-12(3) to egress line card 16. The simulation provided for 9 traffic sources at 10 Gbps each transmitting point to point to 3 ports (26(1), 26(2), and 26(3)) in egress chip 16 corresponding to Flow 1, Flow 2, and Flow 3. Egress ports 26(1)-26(4) were configured to send out packets at 10 Gbps, leading to congestion at each egress port.

At 25 ms, Flow 4, comprising one bursty source transmitted 10 packets at 10 Gbps through ingress line cards 12(1)-12(3) to a fourth port in egress chip 16. All ports 20(1)-20(12) were assigned an equal weight of 1. Because of congestion at each egress port (e.g., from 9 sources sending packets at 10 Gbps to three egress ports sending out traffic at 10 Gbps), the bursty traffic would be dropped at ingress line cards 12(1)-12(3) if operations described herein are not implemented in the communication system. However, with operations as described herein implemented, the bursty traffic corresponding to Flow 4 would be allowed to go through appropriately.

$Q_{len}$ (e.g., global VOQ length) was determined to be 300 KB; $Q_{ref}$ was set at 150 KB; $Q_{min}$ was determined to be 70 KB, and the predetermined duration was set at 20 µs. Total buffer size (in any of ingress line cards 12(1)-12(3) and egress line card 16) was set at 350 KB. VOQ minimum buffer size was set at 1500 B, and VOQ maximum buffer size was set at 150 KB. VOQ lengths for Flow 1, Flow 2 and Flow 3 was measured at each ingress line card 12(1)-12(3) to determine, for example, if there was a fair share bandwidth allocation.

Figure 9:
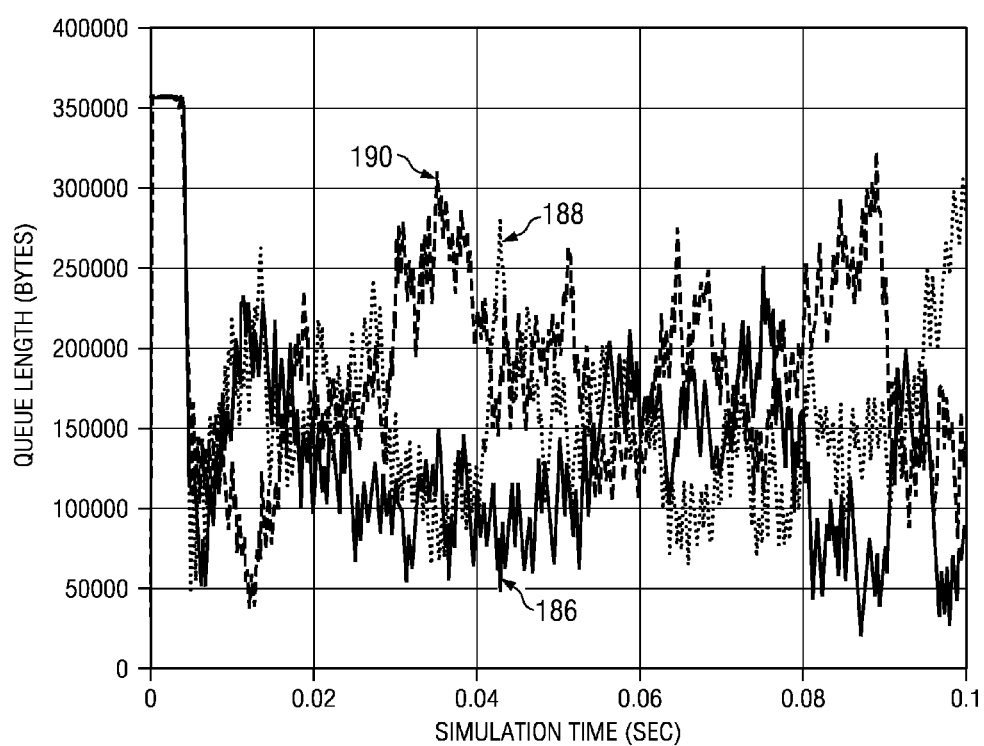
FIG. 9 is a graph illustrating queue length measured from the example simulation set-up.

Turning to FIG. 9, FIG. 9 is a graph illustrating queue length varying with simulation time for each of ingress line cards 12(1)-12(3) described with reference to FIG. 8. VOQ length of ingress line card 12(1) is represented by line 186; VOQ length of ingress line card 12(2) is represented by line 188; and VOQ length of ingress line card 12(3) is represented by line 190. As can be seen from the graph, VOQ lengths were variable and changed with time based on fair share bandwidth allocation mechanisms as described herein. No single ingress line card took up an inordinate bandwidth. Further, the results indicated that without implementing the mechanisms as described herein, Flow 1, Flow 2, and Flow 3 lost 3 packets due to tail drop, whereas by implementing the mechanisms as described herein, distributed resource control was achieved, and all 10 packets were received at egress line card 16.

Figure 10:
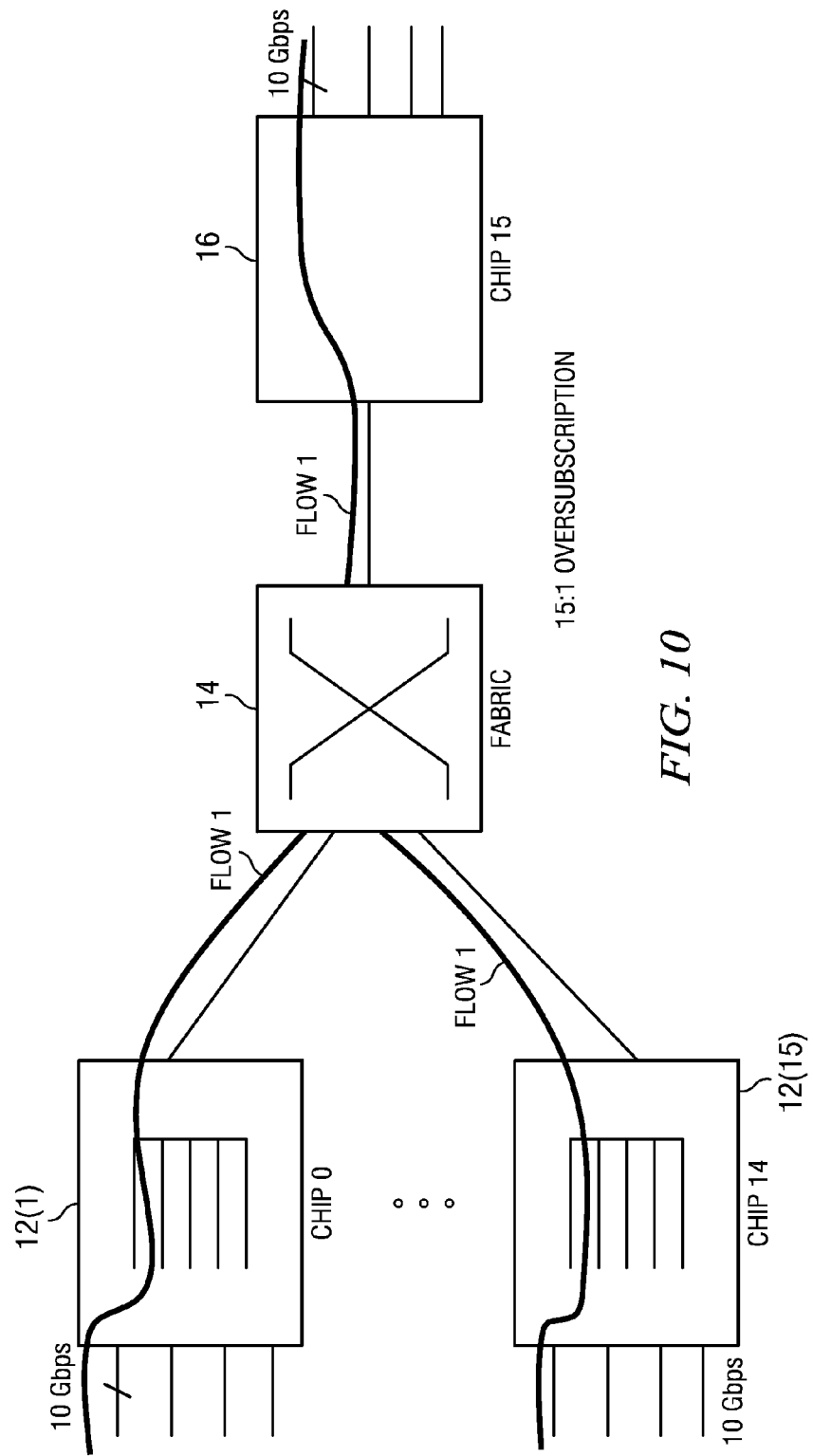
FIG. 10 is a simplified diagram illustrating another example simulation set-up of an embodiment of the communication system.

Turning to FIG. 10, FIG. 10 is a simplified block diagram illustrating another simulation set up of an embodiment of communication system 10. Ingress line cards 12(1)-12(15) routed a traffic flow (Flow 1) to one egress line card 16, providing an oversubscription of 15:1. $Q_{len}$ was determined to be 25 MB (or 20 ms); $Q_{ref}$ was set at 1.25 MB (or 1 ms); $Q_{min}$ was determined to be 70 KB, and the predetermined duration was set at 200 µs. VOQ minimum buffer size was set at 1500 B, and VOQ maximum buffer size was set at 12.5 MB (or 10 ms). Output delay was measured at egress line card 16 to determine, for example, if there was a fair share bandwidth allocation.

Figure 11:
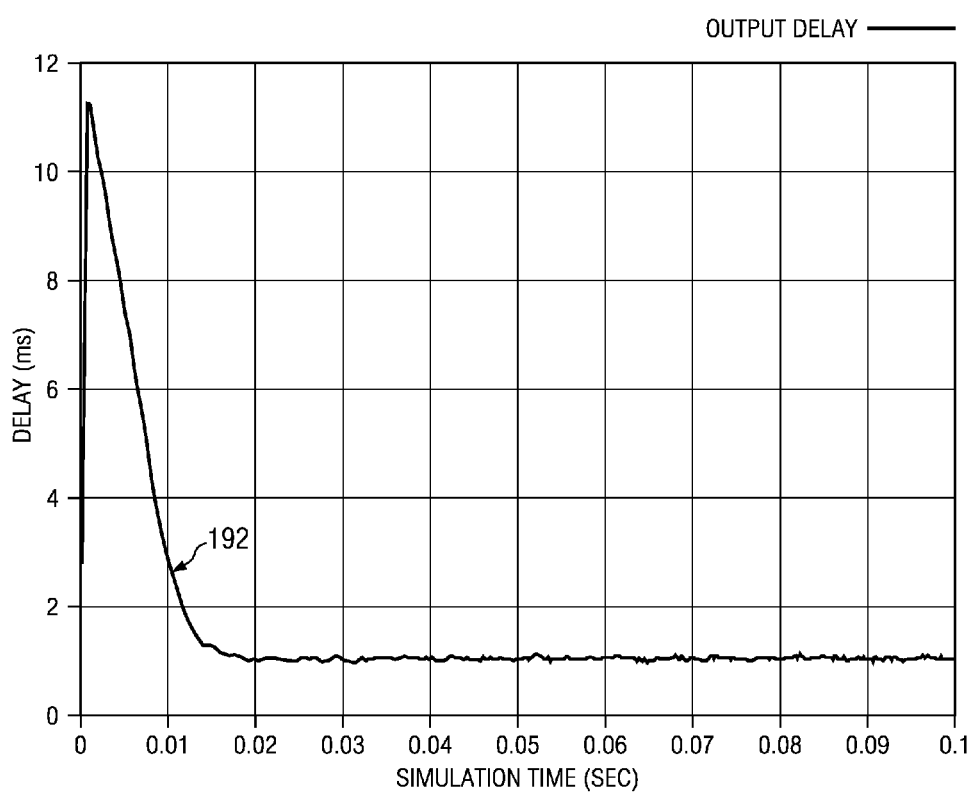
FIG. 11 is a graph illustrating delay measured from the simulation set up.

Turning to FIG. 11, FIG. 11 is a graph illustrating output delay over simulation time at egress line card 16 in the simulation described with reference to FIG. 10. Output delay 192 indicated a tapering off at around 0.01 s of simulation time, and stabilization at around 1 ms delay. Without implementing the mechanisms as described herein, total delay would have increased to around 150 ms at 0.01 s and stabilized at approximately 150 ms thereafter. Thus, output delay may be decreased using the mechanisms described herein.

Figure 12:
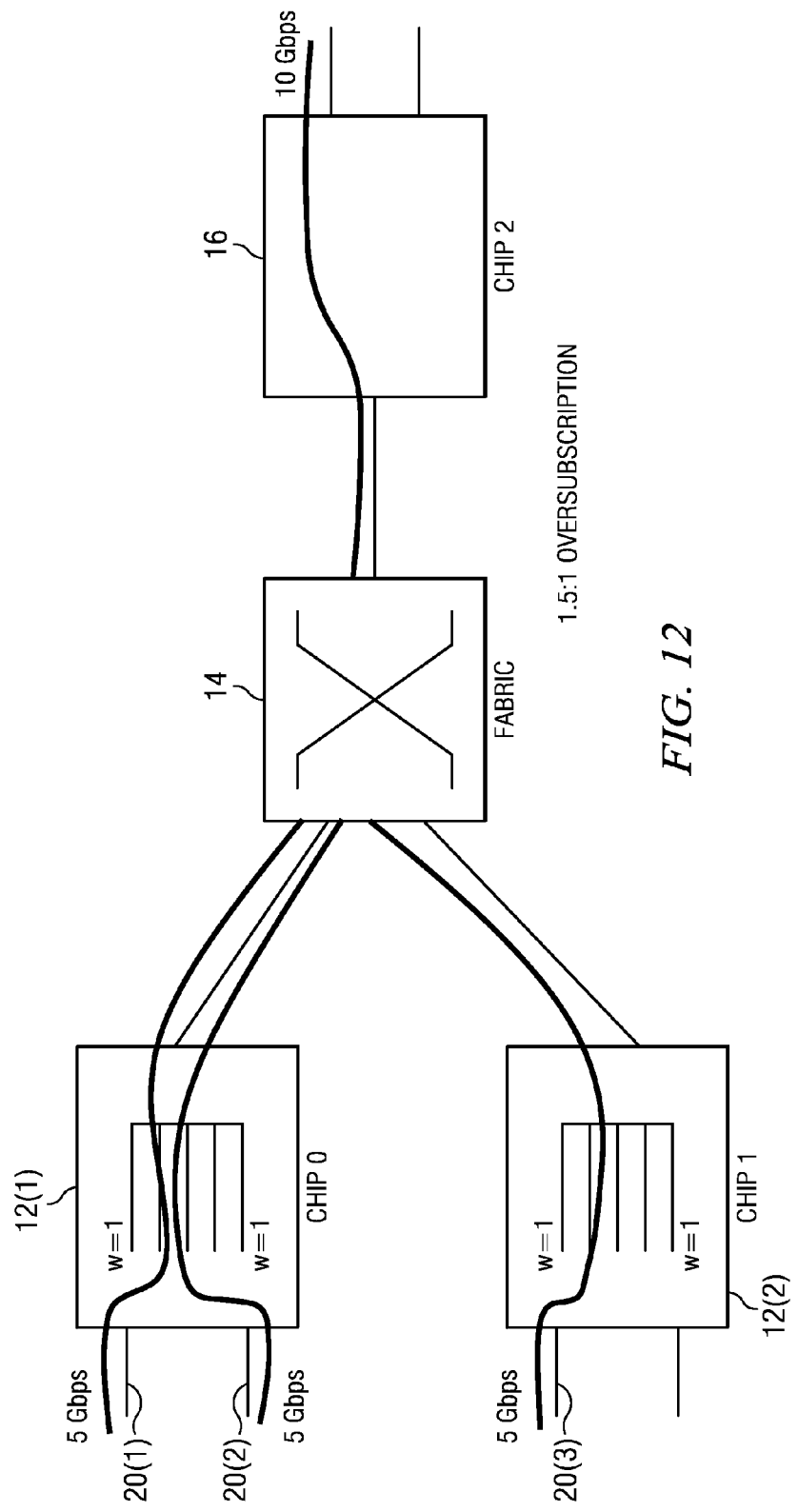
FIG. 12 is a simplified diagram illustrating yet another example simulation set-up of an embodiment of the communication system.

Turning to FIG. 12, FIG. 12 is a simplified block diagram illustrating yet another simulation set up of an embodiment of communication system 10. Ingress line cards 12(1)-12(2) routed a traffic flow (Flow 1) to one egress line card 16, from three ports 20(1)-20(3), providing an oversubscription of 1.5:1. $Q_{len}$ was determined to be 300 KB; $Q_{ref}$ was set at 150 KB; $Q_{min}$ was determined to be 70 KB, and the predetermined duration was set at 20 µs. Throughput was measured at egress line card 16 to determine, for example, if there was a fair share bandwidth allocation.

Figure 13:
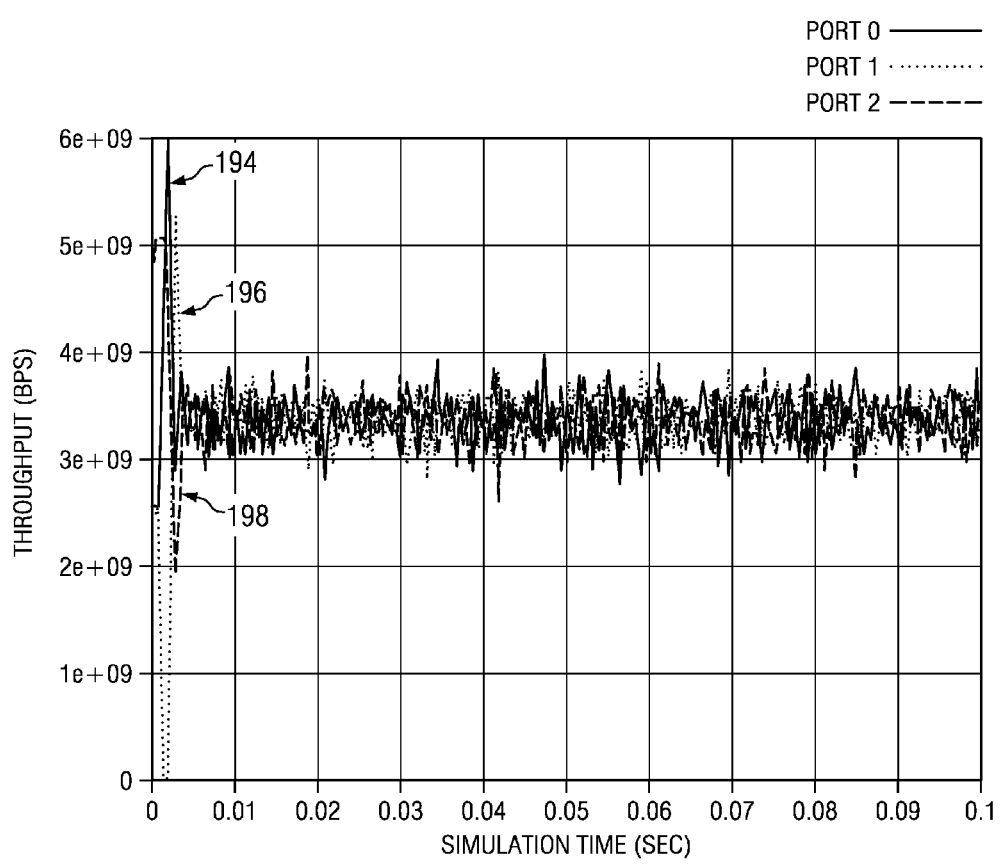
FIG. 13 is a graph illustrating throughput measured from the simulation set up.

Turning to FIG. 13, FIG. 13 is a graph illustrating throughput over simulation time at egress line card 16 in the simulation described with reference to FIG. 12. Throughput (in bps) at ports 20(1)-20(3) are indicated by lines 194, 196, and 198, respectively. As all ports 20(1)-20(3) have equal weight, each port 20(1)-20(3) receive approximately 33% of the bandwidth (i.e., 3.3 Gbps), showing a fair share allocation.

Figure 14:
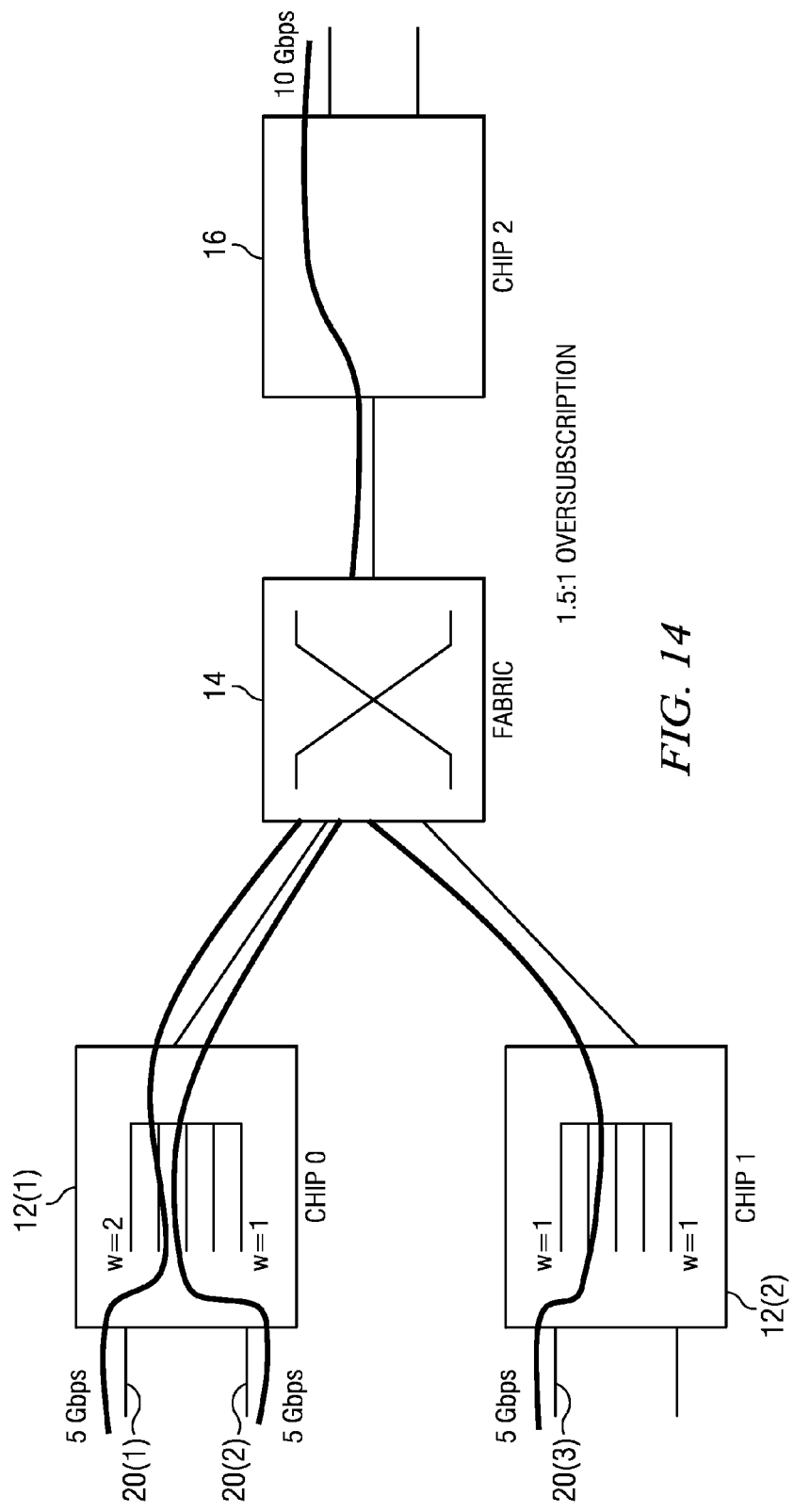
FIG. 14 is a simplified diagram illustrating another yet example simulation set-up of an embodiment of the communication system.

Turning to FIG. 14, FIG. 14 is a simplified block diagram illustrating yet another simulation set up of an embodiment of communication system 10. Ingress line cards 12(1)-12(2) routed a traffic flow (Flow 1) to one egress line card 16, from three ports 20(1)-20(3), providing an oversubscription of 1.5:1. Input port 20(1) was assigned a weight of 2, and input ports 20(2) and 20(3) were each assigned a weight of 1. $Q_{len}$, $Q_{ref}$, $Q_{min}$ and the predetermined duration were the same as for the simulation described with reference to FIG. 12. Throughput was measured at egress line card 16 to determine, for example, if there was a fair share bandwidth allocation.

Figure 15:
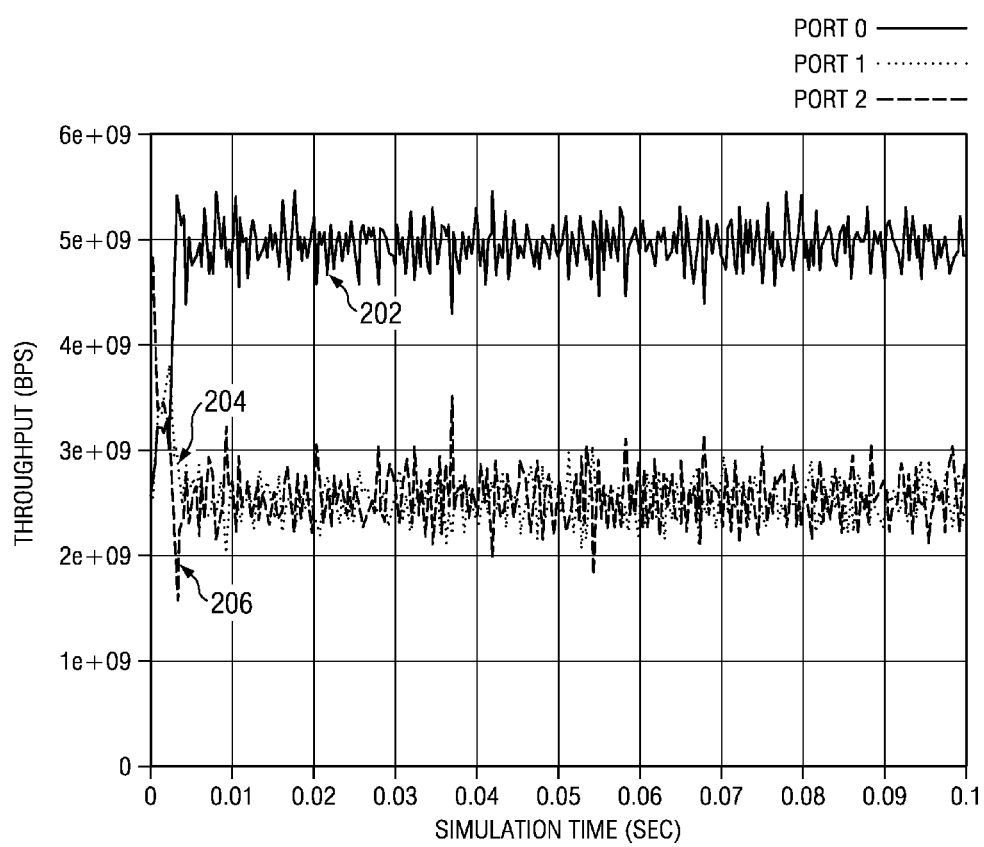
FIG. 15 is a graph illustrating throughput measured from the simulation set up.

Turning to FIG. 15, FIG. 15 is a graph illustrating throughput over simulation time at egress line card 16 in the simulation described with reference to FIG. 14. Throughput (in bps) at port 20(1) was approximately 50% (e.g., 5 Gbps), as indicated by line 202, and throughput at ports 20(2) and 20(3) were approximately 30% (e.g., 3 Gbps) as indicated by lines 204 and 206, respectively.

Figure 16:
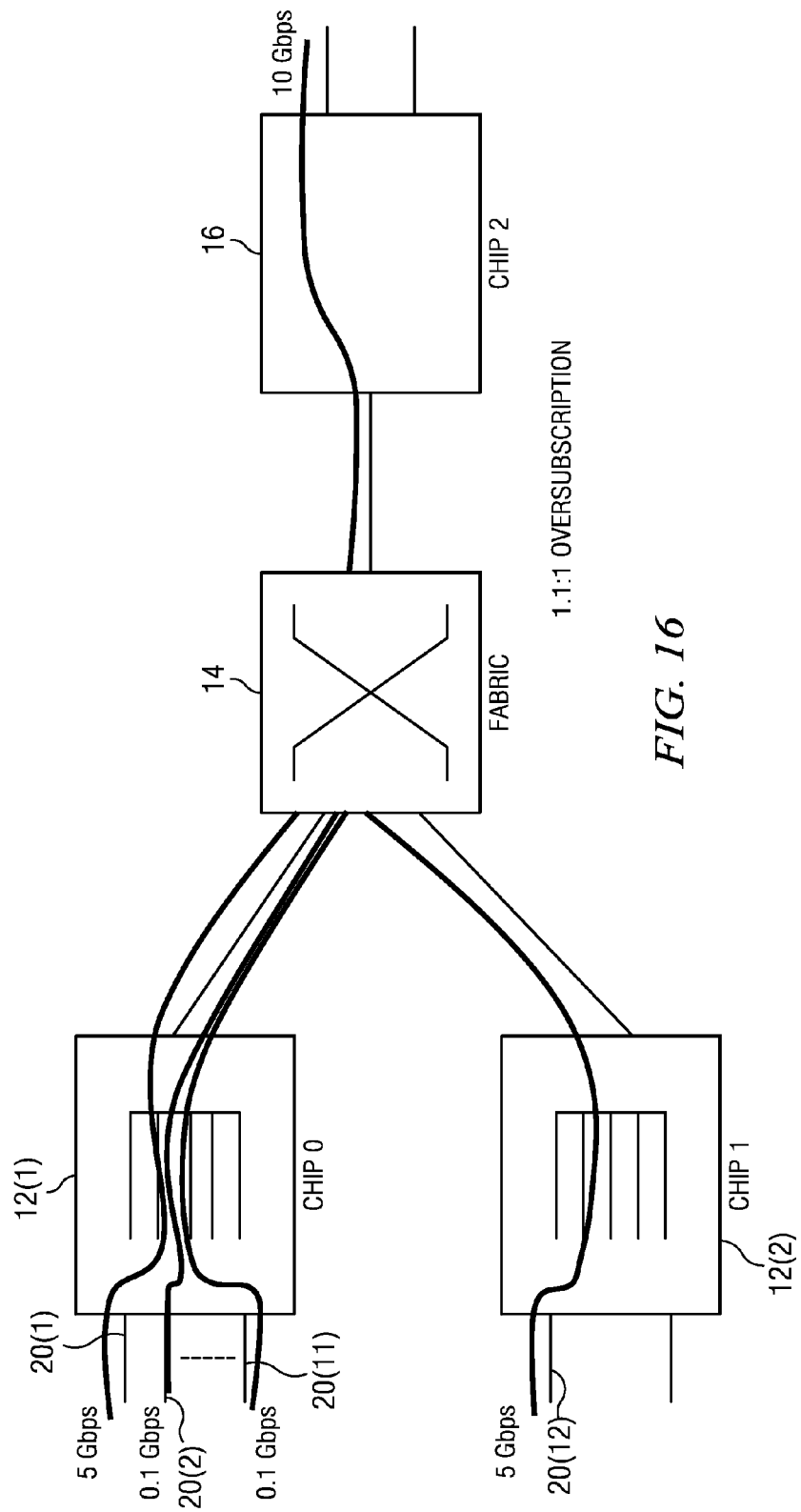
FIG. 16 is a simplified diagram illustrating another example simulation set-up of an embodiment of the communication system.

Turning to FIG. 16, FIG. 16 is a simplified block diagram illustrating yet another simulation set up of an embodiment of communication system 10. Ingress line card 12(1) included 11 ports 20(1)-20(11), and ingress line card 12(2) included one port 20(12), for a total of 12 ports routing traffic to egress line card 16. Ingress ports 20(1) and 20(12) received packets in Flow 1 (CoS 0) at 5 Gbps, and ingress ports 20(2)-20(11) received packets from 10 small traffic sources at 0.1 Gbps in the same flow (CoS 0). All ingress ports 20(1)-20(12) were assigned equal weights of 1. $Q_{len}$, $Q_{ref}$, $Q_{min}$ and the predetermined duration were the same as for the simulation described with reference to FIG. 12. Throughput was measured at egress line card 16 to determine, for example, if there was a fair share bandwidth allocation.

Figure 17:
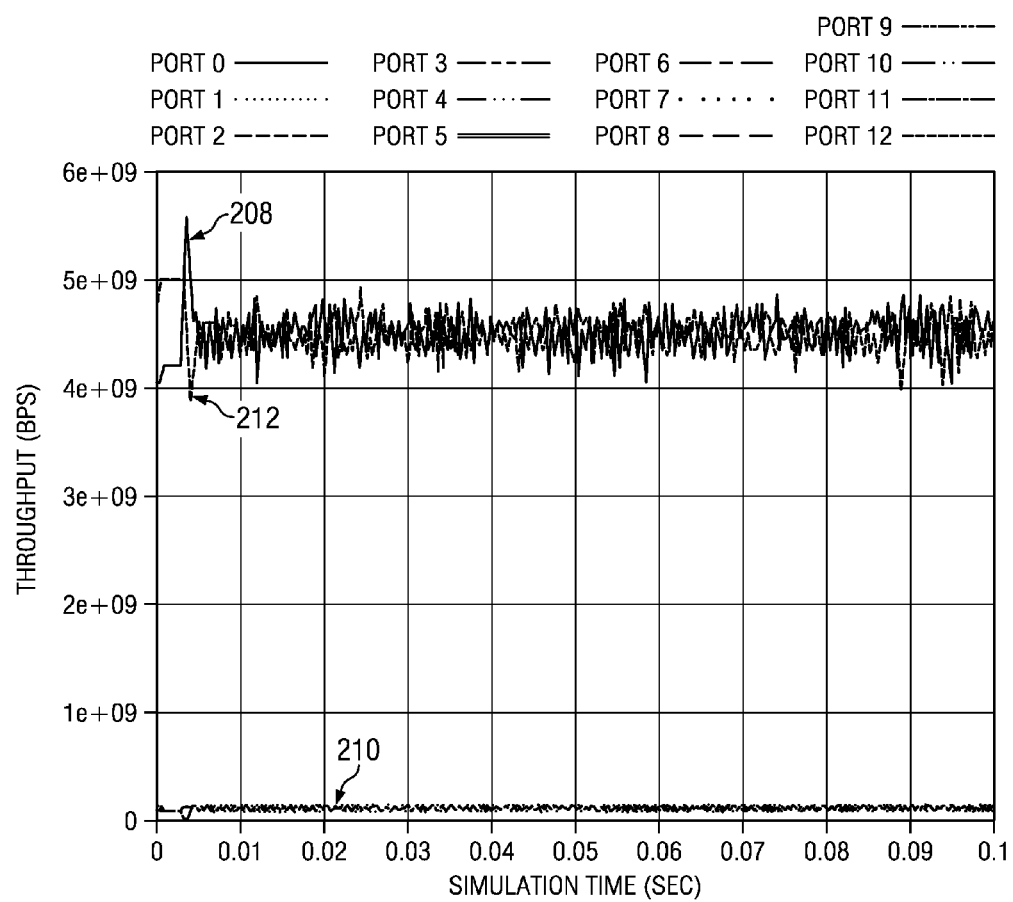
FIG. 17 is a graph illustrating throughput measured from the simulation set up.

Turning to FIG. 17, FIG. 17 is a graph illustrating throughput over simulation time at egress line card 16 in the simulation described with reference to FIG. 16. Throughput (in bps) at ports 20(1)-20(12) are indicated by lines 208 and 210, respectively. Throughput at ports 20(2)-20(11) are indicated collectively by lines 212. The higher bandwidth ports 20(1) and 20(12) receive fair share of approximately 45% (4.5 Gbps), and the other small source ports each receive fair share of approximately 1% (0.1 Gbps), indicating a fair share allocation. Substantially no packets are dropped, even from small sources, and each port receives a fair share of bandwidth.

Note that in this Specification, references to various features (e.g., elements, structures, modules, components, steps, operations, characteristics, etc.) included in "one embodiment", "example embodiment", "an embodiment", "another embodiment", "some embodiments", "various embodiments", "other embodiments", "alternative embodiment", and the like are intended to mean that any such features are included in one or more embodiments of the present disclosure, but may or may not necessarily be combined in the same embodiments. Note also that an 'application' as used herein this Specification, can be inclusive of an executable file comprising instructions that can be understood and processed on a computer, and may further include library modules loaded during execution, object files, system files, hardware logic, software logic, or any other executable modules.

In example implementations, at least some portions of the activities outlined herein may be implemented in software in, for example, ingress chip 28 and egress chip 30. In some embodiments, one or more of these features may be implemented in hardware, provided external to these elements, or consolidated in any appropriate manner to achieve the intended functionality. The various network elements (e.g., VOQ switch 17) may include software (or reciprocating software) that can coordinate in order to achieve the operations as outlined herein. In still other embodiments, these elements may include any suitable algorithms, hardware, software, components, modules, interfaces, or objects that facilitate the operations thereof.

Furthermore, ingress chip 28 and egress chip 30 described and shown herein (and/or their associated structures) may also include suitable interfaces for receiving, transmitting, and/or otherwise communicating data or information in a network environment. Additionally, some of the processors and memory elements associated with the various nodes may be removed, or otherwise consolidated such that a single processor and a single memory element are responsible for certain activities. In a general sense, the arrangements depicted in the FIGURES may be more logical in their representations, whereas a physical architecture may include various permutations, combinations, and/or hybrids of these elements. It is imperative to note that countless possible design configurations can be used to achieve the operational objectives outlined here. Accordingly, the associated infrastructure has a myriad of substitute arrangements, design choices, device possibilities, hardware configurations, software implementations, equipment options, etc.

In some of example embodiments, one or more memory elements (e.g., 42, 52) can store data used for the operations described herein. This includes the memory element being able to store instructions (e.g., software, logic, code, etc.) in non-transitory media, such that the instructions are executed to carry out the activities described in this Specification. A processor can execute any type of instructions associated with the data to achieve the operations detailed herein in this Specification. In one example, processors (e.g., 40, 50) could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an erasable programmable read only memory (EPROM), an electrically erasable programmable read only memory (EEPROM)), an ASIC that includes digital logic, software, code, electronic instructions, flash memory, optical disks, CD-ROMs, DVD ROMs, magnetic or optical cards, other types of machine-readable mediums suitable for storing electronic instructions, or any suitable combination thereof.

These devices may further keep information in any suitable type of non-transitory storage medium (e.g., random access memory (RAM), read only memory (ROM), field programmable gate array (FPGA), erasable programmable read only memory (EPROM), electrically erasable programmable ROM (EEPROM), etc.), software, hardware, or in any other suitable component, device, element, or object where appropriate and based on particular needs. The information being tracked, sent, received, or stored in communication system 10 could be provided in any database, register, table, cache, queue, control list, or storage structure, based on particular needs and implementations, all of which could be referenced in any suitable timeframe. Any of the memory items discussed herein should be construed as being encompassed within the broad term 'memory element.' Similarly, any of the potential processing elements, modules, and machines described in this Specification should be construed as being encompassed within the broad term 'processor.'

It is also important to note that the operations and steps described with reference to the preceding FIGURES illustrate only some of the possible scenarios that may be executed by, or within, the system. Some of these operations may be deleted or removed where appropriate, or these steps may be modified or changed considerably without departing from the scope of the discussed concepts. In addition, the timing of these operations may be altered considerably and still achieve the results taught in this disclosure. The preceding operational flows have been offered for purposes of example and discussion. Substantial flexibility is provided by the system in that any suitable arrangements, chronologies, configurations, and timing mechanisms may be provided without departing from the teachings of the discussed concepts.

Although the present disclosure has been described in detail with reference to particular arrangements and configurations, these example configurations and arrangements may be changed significantly without departing from the scope of the present disclosure. For example, although the present disclosure has been described with reference to particular communication exchanges involving certain network access and protocols, communication system 10 may be applicable to other exchanges or routing protocols. Moreover, although communication system 10 has been illustrated with reference to particular elements and operations that facilitate the communication process, these elements, and operations may be replaced by any suitable architecture or process that achieves the intended functionality of communication system 10.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

What is claimed is:

1. A method, comprising:
   sending a virtual output queue (VOQ) length of a VOQ to an egress chip, wherein the VOQ relates to a flow routed through an egress port associated with the egress chip, and wherein an ingress chip and the egress chip are provided in a VOQ switch;
   receiving fair share information for the VOQ from the egress chip;
   calculating a fair share portion for an ingress port associated with the ingress chip from the fair share information;
   monitoring an arrival rate of incoming packets of the flow at the ingress port;
   calculating a probability of dropping packets at the ingress port based on the fair share portion and the arrival rate; and
   enforcing a control action on the incoming packets based on the calculated probability.

2. The method of claim 1, further comprising:
   determining if the arrival rate is greater than the fair share portion.

3. The method of claim 2, wherein a high probability indicates that the incoming packets will be dropped at the ingress port.

4. The method of claim 3, wherein the probability of dropping packets is further based on a weight assigned to the ingress port, wherein a higher weight indicates a lower probability.

5. The method of claim 1, wherein the fair share information comprises a fair share of the egress port and class of service.

6. The method of claim 1, further comprising:
   receiving VOQ lengths of corresponding VOQs from respective ingress chips, wherein the VOQs relate to the flow;
   calculating respective fair share information for each VOQ; and
   sending the fair share information to the respective ingress chips.

7. The method of claim 6, wherein the respective fair share information comprises a global VOQ length determined as a sum of the VOQ lengths.

8. The method of claim 6, wherein the respective fair share information comprises an instruction to drop packets if a sum of the VOQ lengths exceeds a predetermined threshold.

9. The method of claim 1, wherein the control action is a selected one of a group of actions, the group consisting of:
   a) dropping packets;
   b) pausing packets; and
   c) marking packets.

10. The method of claim 1, further comprising:
    sampling VOQ lengths received during a predetermined duration to calculate the fair share information.

11. Non-transitory media storage encoding logic that includes instructions for execution and when executed by a processor, is operable to perform operations comprising:
    sending a virtual output queue (VOQ) length of a VOQ to an egress chip, wherein the VOQ relates to a flow routed through an egress port associated with the egress chip, and wherein an ingress chip and the egress chip are provided in a VOQ switch;
    receiving fair share information for the VOQ from the egress chip;
    calculating a fair share portion for an ingress port associated with the ingress chip from the fair share information;
    monitoring an arrival rate of incoming packets of the flow at the ingress port;
    calculating a probability of dropping packets at the ingress port based on the fair share portion and the arrival rate; and
    enforcing a control action on the incoming packets based on the calculated probability.

12. The media of claim 11, further comprising:
    determining if the arrival rate is greater than the fair share portion.

13. The media of claim 12, wherein a high probability indicates that the incoming packets will be dropped at the ingress port.

14. The media of claim 11, further comprising:
    receiving VOQ lengths of corresponding VOQs from respective ingress chips, wherein the VOQs relate to the flow;
    calculating respective fair share information for each VOQ; and sending the fair share information to the respective ingress chips.

15. The media of claim 11, wherein the control action is a selected one of a group of actions, the group consisting of:
   a) dropping packets;
   b) pausing packets; and
   c) marking packets.

16. An apparatus, comprising:
   a memory element for storing data; and
   a processor that executes instructions associated with the data, wherein the processor and the memory element cooperate such that the apparatus is configured for:
      sending a virtual output queue (VOQ) length of a VOQ to an egress chip, wherein the VOQ relates to a flow routed through an egress port associated with the egress chip, and wherein an ingress chip and the egress chip are provided in a VOQ switch;
      receiving fair share information for the VOQ from the egress chip;
      calculating a fair share portion for an ingress port associated with the ingress chip from the fair share information;
      monitoring an arrival rate of incoming packets of the flow at the ingress port;
      calculating a probability of dropping packets at the ingress port based on the fair share portion and the arrival rate; and
      enforcing a control action on the incoming packets based on the calculated probability.

17. The apparatus of claim 16, further comprising:
   determining if the arrival rate is greater than the fair share portion.

18. The apparatus of claim 17, wherein a high probability indicates that the incoming packets will be dropped at the ingress port.

19. The apparatus of claim 16, further comprising:
   receiving VOQ lengths of corresponding VOQs from respective ingress chips, wherein the VOQs relate to the flow;
   calculating respective fair share information for each VOQ; and
   sending the fair share information to the respective ingress chips.

20. The apparatus of claim 19, wherein the control action is a selected one of a group of actions, the group consisting of:
   a) dropping packets;
   b) pausing packets; and
   c) marking packets.

* * * * *